(12) United States Patent
Verhulst et al.

(10) Patent No.: US 12,551,157 B2
(45) Date of Patent: Feb. 17, 2026

(54) METHOD AND SYSTEM FOR DETERMINING THE INTEGRITY OF AUDITORY NERVE FIBERS AND SYNAPSES

(71) Applicant: Universiteit Gent, Ghent (BE)

(72) Inventors: Sarah Verhulst, Ghent (BE); Viacheslav Vasilkov, Ghent (BE)

(73) Assignee: Universiteit Gent, Ghent (BE)

( * ) Notice: Subject to any disclaimer, the term of this patent is extended or adjusted under 35 U.S.C. 154(b) by 761 days.

(21) Appl. No.: 17/791,985

(22) PCT Filed: Feb. 5, 2021

(86) PCT No.: PCT/EP2021/052848
§ 371 (c)(1),
(2) Date: Jul. 11, 2022

(87) PCT Pub. No.: WO2021/156465
PCT Pub. Date: Aug. 12, 2021

(65) Prior Publication Data
US 2023/0051834 A1    Feb. 16, 2023

(30) Foreign Application Priority Data

Feb. 7, 2020   (WO) ................. PCT/EP2020/053192

(51) Int. Cl.
*A61B 5/38* (2021.01)
*A61B 5/00* (2006.01)
*A61B 5/374* (2021.01)

(52) U.S. Cl.
CPC ................ *A61B 5/38* (2021.01); *A61B 5/374* (2021.01); *A61B 5/7257* (2013.01)

(58) Field of Classification Search
None
See application file for complete search history.

(56) References Cited

U.S. PATENT DOCUMENTS

2006/0161075 A1    7/2006  Kurtz
2020/0139124 A1*   5/2020  Amurthur .......... A61N 1/36036

FOREIGN PATENT DOCUMENTS

| CN | 101569778 A | 11/2009 |
| CN | 102137624 A | 7/2011 |
| CN | 110473553 A | 11/2019 |
| CN | 110662151 A | 1/2020 |
| EP | 1 65 8810 A1 | 5/2006 |
| EP | 2332465 A1 | 6/2015 |
| EP | 3 281 585 A1 | 2/2018 |

(Continued)

OTHER PUBLICATIONS

PCT International Search Report dated May 25, 2021 in connection with PCT/EP2021/052848.

(Continued)

*Primary Examiner* — Etsub D Berhanu
*Assistant Examiner* — Nelson Alexander Glover
(74) *Attorney, Agent, or Firm* — Amster, Rothstein & Ebenstein LLP

(57) ABSTRACT

The present invention is in the field of hearing tests. In particular, the present invention relates to systems and methods for determining the integrity of Auditory Nerve Fibers (ANFs) and/or afferent Auditory Nerve Synapses (ANSs) and/or inner-hair cells (IHC) in a subject.

18 Claims, 17 Drawing Sheets

(56) References Cited

FOREIGN PATENT DOCUMENTS

WO    2020000028  A1    1/2020

OTHER PUBLICATIONS

PCT Written Opinion of the International Searching Authority Report dated May 25, 2021 in connection with PCT/EP2021/052848.
PCT International Search Report dated Aug. 19, 2020 in connection with PCT/EP2020/053192.
PCT Written Opinion of the International Searching Authority Report dated Aug. 19, 2020 in connection with PCT/EP2020/053192.
Chinese Office Action as Issued on Jul. 12, 2024 in Respect to Counterpart Chinese Patent Application No. 2021800134038 and Its English Deepl Translation.

\* cited by examiner

*Kujawa and Liberman (2009)*

METHOD AND SYSTEM FOR DETERMINING THE INTEGRITY OF AUDITORY NERVE FIBERS AND SYNAPSES

CROSS-REFERENCE TO RELATED APPLICATIONS

This application is a U.S. national stage entry under 35 U.S.C. § 371 of PCT International Patent Application No. PCT/EP2021/052848, filed Feb. 5 2021, which claims priority to PCT International Patent Application No. PCT/EP2020/053192, filed Feb. 7, 2020, the contents of each of which are incorporated herein by reference in their entirety.

TECHNICAL FIELD

The present invention is in the field of hearing tests. In particular, the present invention relates to systems and methods for determining the integrity of Auditory Nerve Fibers (ANFs) and/or afferent Auditory Nerve Synapses (ANSs) and/or inner-hair cells (IHC) in a subject.

BACKGROUND

Hearing loss can be attributable to several measurable factors, including outer-hair cell (OHC) and inner-hair cell (IHC) damage or loss, and Auditory Nerve (AN) dysfunction or loss. AN dysfunction may occur when auditory nerve synapses (ANS) are damaged and but not the fiber itself; AN loss may occur as a result of damage to the auditory nerve fiber (ANF). A reduction in the number of ANFs and ANSs as compared to the total number of ANFs and ANSs present in the healthy ear (30 000 to 45 000 depending on species) is called cochlear synaptopathy.

Cochlear synaptopathy commonly occurs as a result of ageing, of exposure to loud noise, or of ototoxic drugs. However, as illustrated in FIG. 1 the cochlea is deeply embedded within the temporal bone, rendering a direct assessment of the functional ANFs and their synapses impossible in living humans. So far, damage to ANFs and ANSs could only be quantified in isolation using post-mortem temporal bone histology (human or animal), where the ANF can be immune-stained, labeled, and ANFs and ANSs counted using imaging techniques.

Inner-hair cell (IHC) deafferentation, i.e., a reduction in the number of afferents in contact with the IHCs, can be linked to a degradation of ANSs and ANFs, typically resulting in 100% synaptopathy. Nonetheless, under certain conditions the IHCs can be affected separately from the ANFs and ANSs, which may, for example, be caused by specific medical treatments such as chemotherapy. The art fails to reliably separate IHC damage from OHC damage.

Current clinical practice assesses hearing loss mostly by means of threshold tests, e.g. pure-tone audiogram, a sound perception test which aims to assess hearing sensitivity, i.e. the minimal pressure level a pure-tone or sound needs to be to be able to detect it. This test measures to which degree individuals require a higher sound level (in dB) than a reference standard normal-hearing group to detect the same sound (i.e., test repeated for different sound frequencies). The test outcome provides a hearing sensitivity loss in dB for frequencies between 0.125 and max 16 kHz. Because the audiogram tests hearing sensitivity, it is useful as a marker for outer-hair cell (OHC) damage in the inner ear (i.e. the cochlear cellular elements which amplify sound in the inner ear, see FIG. 1). However, testing of hearing sensitivity is unsuitable for predicting cochlear synaptopathy (i.e., the light-colored box in FIG. 1 shows the ANSs and ANFs synapsing onto an inner-hair cell in the cochlea).

Other, non-invasive physiological tests exist to assess the status of hearing: these tests include, e.g., otoacoustic emissions (OAE), or brainstem EEG, ABR/BERA test, or the auditory steady-state response (ASSR) test. However, the listed tests mostly reflect the outer-hair cell (OHC) integrity (OAE), or are affected by the OHC status (EEG, ABR/BERA, and ASSR). The latter tests hence fail to differentiate between damage to OHCs and degeneration of ANF/ANSs, and moreover, they fail to provide an objective way to quantify ANF and/or ANS degeneration and in the extreme case a full deafferentation or IHC loss. Presently, the listed clinical tests only determine whether a sound is detected or not, but are unable to measure the response level of the auditory system in a precise, quantified way. Additionally, some of these tests are cumbersome to perform and may require specialized systems to gather and process the measured data.

The art describes the use of a sinusoidal amplitude-modulated (SAM) auditory stimulus to mimic the fast-changing temporal features in speech in an effort to study the human auditory response. For example, EP 1 658 810 describes the generation of various auditory sinusoidal-like stimuli to evoke the auditory steady state response. Alternatively, EP 3 281 585 describes that the auditory steady state response can also be evoked using a complex speech-like stimulus generated using automatic algorithms. However, the art fails to provide a diagnostic test to reliably quantify the degree of hearing damage related to ANF and/or ANS in a subject. Providing a non-invasive diagnostic test for determining the degree of cochlear synaptopathy—and not just its presence—in humans may provide a new, objective marker of hearing damage, so far not clinically considered. This test will render hearing diagnostics more precise and can hence improve treatment. Moreover, it may allow for calibrating hearing aids with user-specific parameters, which better reflect the hearing loss of the individual and may also provide improvements for augmented hearing tools.

Accordingly, there is a need for systems and methods that can aid in determining cochlear synaptopathy, preferably wherein ANF and ANS integrity is determined or quantified in isolation (i.e. without influence of the degree of OHC damage/loss). In particular, there is a need for sensitive, non-invasive, diagnostic tests and systems for detecting synaptopathy, specifically in living humans (not in post-mortem cochlear material). Likewise, there is a need sensitive, non-invasive, diagnostic tests and systems for detecting IHC loss. Additionally, there is a need for tests and systems which quantify ANF and ANS degeneration in a broad range of people. Particularly, people over 50 years of age often complain about self-reported hearing difficulties which may be the consequence of cochlear synaptopathy. But listeners in that age range also often have demonstrated OHC damage. The diagnostic ANS and ANF integrity test should hence also be sensitive and applicable in this group of older people with mixed hearing loss pathologies.

SUMMARY OF THE INVENTION

The present invention overcomes one or more of these issues. Preferred embodiments of the present invention overcome one or more of these issues, for example by:

(I) enhancing the EEG response strength over existing EEG-based auditory tests (e.g., in the ASSR) such that individual differences in response strength can be significantly interpreted;

(II) demonstrating a stronger sensitivity of the EEG response strength to ANF and ANS integrity than to the OHC-related aspects of sensorineural hearing loss, hence providing a differential test for cochlear synaptopathy in listeners with or without mixed OHC-AN damage patterns;

(III) adopting an EEG-analysis method which extracts all signal-related EEG-response components to enable an interpretation in terms of the degree of AN damage; thereby providing a method which is more precise and sensitive to determine the ANF and ANS integrity than other existing ASSR analysis methods which only extract a single EEG-response feature;

(IV) adopting an EEG-analysis method which reduces confounding effects related to the individual electrophysiological noise floor, to yield a relative marker of ANF and ANS integrity;

(V) adopting an EEG-analysis method which is robust to recording artifacts of the EEG response at non-relevant frequencies, e.g. eye-movement-artifacts. This method is more robust than other EEG-based hearing tests which are analyzed in the time-domain (e.g. BERA/ABR amplitudes);

(VI) adopting an EEG-based measurement procedure with a relatively fast (approximately 10 mins) and easy-to-implement protocol which can be integrated with existing EEG recording devices;

(VII) adopting an approach which combines an improved, sensitive stimulation paradigm with the proposed EEG analysis method to yield a noise-robust measure with enhanced diagnostic power of quantifying ANF and ANS integrity in realistic clinical environments (without the need of special equipment, e.g. electrically shielded and sound-proof chamber, high-density EEG); and/or, (VIII) optimizing the EEG-method and procedure such that fewer signal-repetitions are necessary to reach a significant response level above the noise floor (compared to the number of repetitions needed in other methods of the same signal-to-noise quality), which reduces the overall required testing time of our new method.

The present invention relates to a computer-implemented method for determining the integrity of auditory nerve fibers and/or synapses in a subject, comprising the steps of:
 a) receiving brain activity data, preferably EEG or MEG signals, more preferably EEG signals, of the subject exposed to an auditory stimulation s(t), wherein the auditory stimulation s(t) comprises a carrier signal c(t) amplitude modulated by a non-sinusoidal periodic modulator m(t); and,
 b) determining from the brain activity data, a subject-specific degree of the integrity of the whole or a subset of the auditory nerve fibers and/or synapses.

The present invention also relates to a computer-implemented method for determining the integrity of auditory nerve fibers and/or synapses in a subject, comprising the steps of:
 a) generating an auditory stimulation s(t), wherein the auditory stimulation comprises a carrier signal c(t) amplitude modulated by a non-sinusoidal periodic modulator m(t); exposing the subject to the auditory stimulation s(t); and, receiving brain activity data, preferably EEG or MEG signals, more preferably EEG signals, of the subject exposed to the auditory stimulation s(t); and,
 b) determining from the brain activity data, a subject-specific degree of the integrity of the whole or a subset of the auditory nerve fibers and/or synapses.

The present invention also relates to a computer-implemented method for determining the integrity of auditory nerve synapses (ANS) and/or auditory nerve fibers (ANF) in a subject, said computer-implemented method comprising the steps of:
 a) receiving neural activity data, preferably EEG or MEG signals, more preferably EEG signals, of the subject exposed to an auditory stimulation s(t); and,
 b) determining from the neural activity data, a subject-specific degree of the integrity of the whole or a subset of the ANS and/or ANF;
preferably wherein the auditory stimulation s(t) comprises a carrier signal c(t) amplitude modulated by a non-sinusoidal periodic modulator m(t) that has a rectangular waveform with a duty cycle d, wherein the duty cycle is at least 10% and at most 40%.

The present invention also relates to a computer-implemented method for determining the integrity of auditory nerve synapses (ANS), auditory nerve fibers (ANF) and/or inner-hair cells (IHC) in a subject, said computer-implemented method comprising the steps of
 a) receiving neural activity data, preferably EEG or MEG signals, more preferably EEG signals, of the subject exposed to an auditory stimulation s(t); and,
 b) determining from the neural activity data, a subject-specific degree of the integrity of the whole or a subset of the ANS and/or ANF and/or IHC;
preferably wherein the auditory stimulation s(t) comprises a carrier signal c(t) amplitude modulated by a non-sinusoidal periodic modulator m(t) that has a rectangular waveform with a duty cycle d, wherein the duty cycle is at least 10% and at most 40%.

In some preferred embodiments, the subject is a human subject. In some preferred embodiments, the non-sinusoidal amplitude modulator m(t) has a rectangular waveform with a duty cycle d, wherein d=W/T, wherein the duty cycle is at least 10% and at most 40%, preferably at least 15% and at most 35%, preferably at least 20% and at most 30%, for example about 25%.

In some preferred embodiments, the non-sinusoidal amplitude modulator m(t) has a rectangular waveform with a slope deviation window $\delta$ in the range of 0 and $\delta_{max}$; wherein $\delta_{max}=0.5*d$, wherein d is the duty cycle.

In some preferred embodiments, the brain activity data of the subject are received in the time domain as a recorded electrical potential between at least two EEG electrodes.

In some preferred embodiments, step b) comprises the step of:
 b2) transforming the brain activity data, preferably the received EEG signals, into the frequency domain (FD), preferably by applying a (discrete) Fourier Transform (dFT) on a time-segment of the EEG signals to the auditory stimulus s(t).

In some preferred embodiments, step b) comprises the step of:
 b4') determining the response magnitude at the frequency F0 corresponding to the stimulus modulation frequency $f_m$ and one or more frequencies F1 to Fn which are harmonics of the modulation frequency.

In some preferred embodiments, step b) comprises the steps of:

identifying at least 2 peaks in the frequency domain, preferably all significant peaks above the noise floor, comprising at least:
the modulation frequency F0 of the stimulus; and,
one or more harmonics of the modulation frequency (F1 to Fn);
reconstructing from the identified peaks a reconstructed time domain waveform, preferably by inverse Fourier Transform (iFT); and,
measuring from the reconstructed time domain waveform, a magnitude of the reconstructed signal;
wherein the magnitude is a measure of the level of the integrity of AN fibers and/or synapses in the subject.

The present invention also relates to a method for generating a personalized mathematical auditory periphery model of a subject for processing sound for an auditory device, the method comprising the steps of:
determining the integrity of AN synapses and/or fibers in the subject according to the method as described herein, and embodiments thereof;
optionally, determining the outer hair cell damage component; and,
generating a personalized mathematical model for processing sound for an auditory device based on the integrity of AN synapses and/or fibers in the subject, and optionally the outer hair cell damage component.

The present invention also relates to a method for modifying a desired auditory response to sound for a subject, the method comprising the steps of:
performing the method as described herein, or an embodiment thereof, to determine the subject specific AN fiber and/or synapse (and optionally OHC) auditory damage profile;
including the auditory profile in an auditory periphery model to simulate auditory responses to any acoustic stimulus;
comparing the individually simulated auditory response to a desired auditory response; and,
including a signal-processing algorithm to adjust the sound stimulus such that the simulated auditory response matches the desired auditory response.

The present invention also relates to the use of the method as described herein as a screening method for the presence of synaptopathy in a subject.

The present invention also relates to the use of the method as described herein as a screening method for quantifying a degree of synaptopathy in the subject, preferably wherein the degree of synaptopathy is defined as a % of AN synapse and/or fiber loss.

The present invention also relates to a method comparing degree of hearing loss caused by synaptopathy and by Outer Hair Cell (OHC) loss in a subject, comprising the steps of:
performing the method as described herein, or embodiments thereof, to quantify the degree of auditory nerve fiber and synapse damage, preferably the degree of synaptopathy, in the subject;
obtaining a marker, for example an EEG-marker, of the subject that is only sensitive to Outer Hair Cell damage; to quantify the degree of outer Hair Cell damage in the subject; and,
mapping the degree of auditory nerve fiber and synapse damage and the degree of Outer Hair Cell damage on a 2-dimensional graph.

The present invention also relates to a system for determining the integrity of auditory nerve synapses (ANS) and/or auditory nerve fibers (ANF) in a subject, the system comprising:
a sound generation and stimulation device for generating an auditory stimulation s(t);
a neural activity screening hardware configured for recording the subject's neural response as neural activity data when said subject is exposed to an auditory stimulation s(t) generated by the sound generation and stimulation device; and,
a processing unit connected to the recording hardware that is configured to
a) receive the neural activity data of the subject exposed to the auditory stimulation s(t), and,
b) determine from the neural activity data, a subject-specific degree of the integrity of the whole or a subset of the ANS and/or ANF;
preferably wherein the auditory stimulation s(t) comprises a carrier signal c(t) amplitude modulated by a non-sinusoidal periodic modulator m(t) that has a rectangular waveform with a duty cycle d, wherein the duty cycle is at least 10% and at most 40%.

The present invention also relates to a system for determining the integrity of auditory nerve synapses (ANS), auditory nerve fibers (ANF) and/or inner-hair cells (IHC) in a subject, the system comprising:
a sound generation and stimulation device for generating an auditory stimulation s(t);
a neural activity screening hardware configured for recording the subject's neural response as neural activity data when said subject is exposed to an auditory stimulation s(t) generated by the sound generation and stimulation device; and, a processing unit connected to the recording hardware that is configured to
a) receive the neural activity data of the subject exposed to the auditory stimulation s(t), and,
b) determine from the neural activity data, a subject-specific degree of the integrity of the whole or a subset of the ANS and/or ANF and/or IHC;
preferably wherein the auditory stimulation s(t) comprises a carrier signal c(t) amplitude modulated by a non-sinusoidal periodic modulator m(t) that has a rectangular waveform with a duty cycle d, wherein the duty cycle is at least 10% and at most 40%.

In some preferred embodiments, the duty cycle is at least 15% and at most 35%, preferably at least 20% and at most 30%, for example about 25%.

In some preferred embodiments, the rectangular waveform has a slope deviation window $\delta$ in the range of 0 and $\delta_{max}$; wherein $\delta_{max}=0.5*d$, wherein d is the duty cycle.

In some preferred embodiments, the screening hardware comprises at least two EEG electrodes and an amplifier; and is configured for recording the subject's neural response as EEG signals in the time domain (TD).

In some preferred embodiments, the subject is a human subject, and the neural activity screening hardware is configured for recording a human neural response.

In some preferred embodiments, the processing unit is configured to transform the neural activity data, preferably the EEG signals, into the frequency domain (FD), preferably by applying a Fourier Transform on a time-segment of the EEG signals to the auditory stimulus s(t).

In some preferred embodiments, the processing unit is configured to determine the response magnitude at the frequency F0 corresponding to the stimulus modulation frequency $f_m$ and one or more frequencies which are harmonics F1 to Fn of the modulation frequency.

In some preferred embodiments, the processing unit is configured to identify at least 2 peaks in the frequency domain, preferably all significant peaks above the noise floor, comprising at least:
the modulation frequency F0 of the stimulus; and,
one or more harmonics of the modulation frequency F1 to Fn;
reconstruct from the identified peaks a reconstructed time domain waveform, preferably by inverse Fourier Transform; and,
measure from the reconstructed time domain waveform, a magnitude of the reconstructed signal; wherein the magnitude is a measure of the level of the integrity of ANS and/or ANF and/or IHC in the subject.

The present invention also relates to a system for determining the integrity of auditory nerve synapses and/or fibers in a subject, the system comprising:
EEG-based hearing screening hardware, comprising electrodes and an amplifier;
a sound generation and stimulation device; and,
a processing unit configured to perform the method according to any one of the methods described herein and embodiments thereof.

The present invention also relates to a system for generating a personalized mathematical auditory periphery model of a subject for processing sound for an auditory device, wherein the processing unit is further configured to:
optionally, determine the outer hair cell damage component; and,
generate a personalized mathematical model for processing sound for an auditory device based on the integrity of ANS and/or ANF and/or IHC in the subject, and optionally the outer hair cell damage component.

The present invention also relates to a system for modifying a desired auditory response to sound for a subject, wherein the processing unit is further configured to:
determine a subject specific ANS and/or ANF auditory damage profile;
include said auditory damage profile in a personalized mathematical auditory periphery model to simulate auditory responses to any acoustic stimulus;
compare the individually simulated auditory response to a desired auditory response; and,
include a signal-processing algorithm to adjust the sound stimulus such that the simulated auditory response matches the desired auditory response.

The present invention also relates to a system for comparing the degree of hearing loss caused by ANS and/or ANF damage (synaptopathy) and/or IHC damage and/or OHC (OHC) damage in a subject, wherein the processing unit is further configured to:
quantify the degree of ANS and/or ANF damage, preferably the degree of synaptopathy and/or IHC loss, for example as a % of ANS and/or ANF and/or IHC loss, in the subject;
obtaining a marker, for example an EEG-marker, of the subject that is only sensitive to Outer Hair Cell damage; to quantify the degree of outer Hair Cell damage in the subject; and,
mapping the degree of ANS and/or ANF and/or IHC damage and the degree of OHC damage, for example on a 2-dimensional graph.

The present invention also relates to a computer program, or a computer program product directly loadable into the internal memory of a computer, or a computer program product stored on a computer readable medium, or a combination of such computer programs or computer program products, configured for performing the method as described herein, or embodiments thereof.

The present invention also relates to a computer program, or a computer program product directly loadable into the internal memory of a computer, or a computer program product stored on a computer readable medium, or a combination of such computer programs or computer program products, configured for performing a computer-implemented method for determining the integrity of auditory nerve synapses (ANS) and/or auditory nerve fibers (ANF) in a subject,
said computer-implemented method comprising the steps of:
a) receiving neural activity data, preferably EEG or MEG signals, more preferably EEG signals, of the subject exposed to an auditory stimulation s(t); and,
b) determining from the neural activity data, a subject-specific degree of the integrity of the whole or a subset of the ANS and/or ANF;
preferably wherein the auditory stimulation s(t) comprises a carrier signal c(t) amplitude modulated by a non-sinusoidal periodic modulator m(t) that has a rectangular waveform with a duty cycle d, wherein the duty cycle is at least 10% and at most 40%.

The present invention also relates to a computer program, or a computer program product directly loadable into the internal memory of a computer, or a computer program product stored on a computer readable medium, or a combination of such computer programs or computer program products, configured for performing a computer-implemented method for determining the integrity of auditory nerve synapses (ANS), auditory nerve fibers (ANF) and/or inner-hair cells (IHC) in a subject,
said computer-implemented method comprising the steps of:
a) receiving neural activity data, preferably EEG or MEG signals, more preferably EEG signals, of the subject exposed to an auditory stimulation s(t); and,
b) determining from the neural activity data, a subject-specific degree of the integrity of the whole or a subset of the ANS and/or ANF and/or IHC;
preferably wherein the auditory stimulation s(t) comprises a carrier signal c(t) amplitude modulated by a non-sinusoidal periodic modulator m(t) that has a rectangular waveform with a duty cycle d, wherein the duty cycle is at least 10% and at most 40%.

DESCRIPTION OF THE FIGURES

The following description of the figures of the invention is only given by way of example and is not intended to limit the present explanation, its application or use. In the drawings, identical reference numerals refer to the same or similar parts and features.

FIG. 2 illustrates an auditory stimulation s(t) created by modulating a pure-tone carrier signal c(t) with a sinusoidal modulator m(t). FIG. 2A illustrates the auditory stimulation s(t) in the time domain, while

FIG. 5 illustrates a schematic of the computation process, based on the averaged EEG data from a young normal hearing (yNH) subject to the rectangular stimulus in FIG. 3B.

FIG. 6 presents the results of auditory response tests performed through auditory stimulation using a sinusoidal amplitude modulated waveform (FIG. 2A, FIG. 6A) as compared to a rectangular (non-sinusoidal) amplitude modulated waveform (FIG. 3B, FIG. 6B) according to a preferred embodiment of the present invention. These results include:

FIG. 7 presents the regression plot of auditory response tests for two auditory profiles: no hearing deficits associated with OHC damage ($NH_{DP}$) and hearing-impaired subjects with OHC damage ($HI_{DP}$). The tests are performed with auditory stimulation using a sinusoidal amplitude modulated waveform (FIG. 2A, FIG. 6A) as compared to a rectangular (non-sinusoidal) amplitude modulated waveform (FIG. 3B, FIG. 6B) according to a preferred embodiment of the present invention. The y-axis shows the estimated DP threshold (higher values reflect more OHC damage), and the x-axis shows the EEG response magnitude ($EFR_{PTN}$). These results include:

FIG. 12 presents model simulations of the neural response to rectangular amplitude modulated (RAM) waveforms in function of the duty cycle (%), ranging from 0.2% duty cycle (RAM0.2) up to 25% duty cycle (RAM25), for normal-hearing (NH) and hearing-impaired with outer hair cell damage ($HI_{OHC}$). RAM25 stimulation yields improved response magnitudes compared to lower % RAM stimulations.

DETAILED DESCRIPTION OF THE INVENTION

Figure 1:
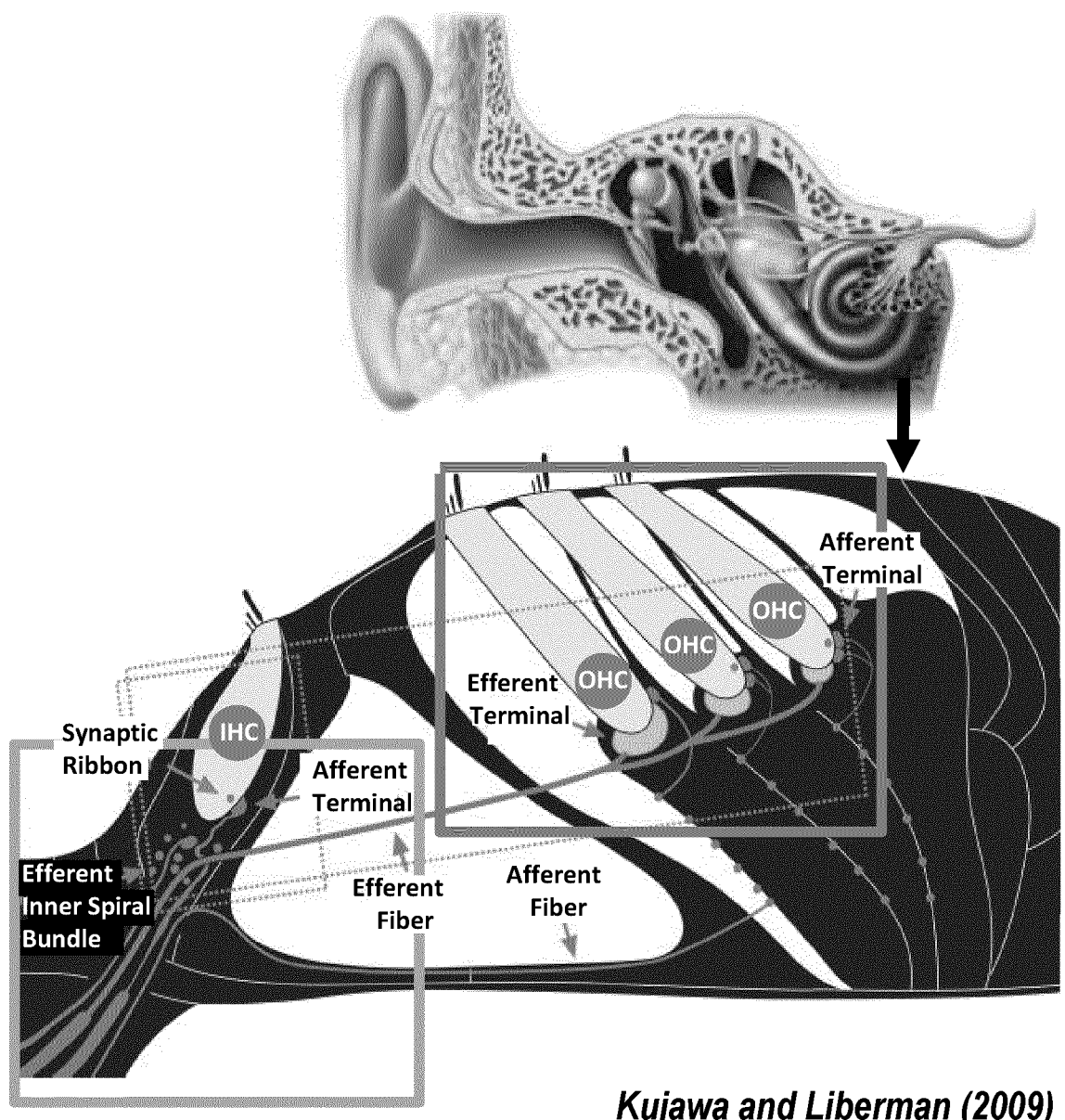
FIG. 1 illustrates a cross-sectional view of a human auditory periphery illustrating the location of the auditory nerve fibers and its synapses within a human cochlea (the box at the base of the IHCs highlights the location of the AN structures at the base of the IHC). Degradation of AN fibers and synapses has been linked to cochlear synaptopathy. Figure courtesy of Kujawa and Liberman in J. Neurosci. (2009); 29(45): 14077-14085.

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts, or steps, this refers to the possibility that other features, parts or steps may also be present, but may also refer to embodiments which only contain the listed features, parts, or steps.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +1-0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Percentages as used herein may also be noted as dimensionless fractions or vice versa. A value of 50% may for example also be written as 0.5 or ½.

Unless defined otherwise, all terms disclosed in the invention, including technical and scientific terms, have the meaning which a person skilled in the art usually gives them. For further guidance, definitions are included to further explain terms which are used in the description of the invention.

Auditory nerve fibers (ANFs) are located in the cochlea (i.e., the auditory area of the inner ear), which transfers auditory information from the cochlea to the brain. Afferent auditory nerve synapses (ANSs) activate the auditory nerve fibers; each ANF typically has one corresponding ANS. There are three types of ANFs with different level-specific properties: Low (LSR), medium (MSR) and high spontaneous rate (HSR) ANFs. Degradation of the number of ANSs and resulting ANF dysfunction or loss has been linked to cochlear synaptopathy, a pathology resulting in partial or even complete hearing loss. The ANF population may be compromised through hearing damage (e.g. through ageing, noise overexposure, and/or ototoxic agents). State-of-art methods are focused on testing the hearing sensitivity of subjects, which is a suitable marker for determining outer-hair cell (OHC) damage but fail to reliably evaluate and quantify ANF or ANS damage.

Inner-hair cell (IHC) deafferentation, i.e., a reduction in the number of afferents in contact with the IHCs, can be linked to a degradation of ANSs and ANFs, typically resulting in 100% synaptopathy. Nonetheless, under certain conditions the IHCs can be affected separately from the ANFs and ANSs, which may, for example, be caused by specific medical treatments such as chemotherapy. The art fails to reliably separate IHC damage from OHC damage.

The present invention relates to systems and methods for determining (such as measuring and/or quantifying) the integrity of ANFs and/or ANSs and/or IHCs in a subject. The term "subject" may refer to an animal. In one aspect the animal may be a mammal. In another aspect, the mammal may be a human. The human may be a healthy human, such as a human with normal hearing, or it may be a patient suffering from an abnormal health condition, such as a partial or complete hearing loss.

The term "integrity" can relate to either or both the functioning of remaining ANFs, as well as to their innervation by afferent cochlear synapses, and/or the functioning of remaining IHCs. The term "integrity" can also relate to the quantification of the number and/or types of damaged ANFs and/or ANSs and/or IHCs. Reduced integrity of the auditory nerve may result in a dysfunction of the auditory nerve (AN), whereby the synapse alone is damaged and not the fiber itself, or in a loss of the AN, whereby the fiber is damaged. The terms "measuring the integrity" or "determining the integrity" as used herein, can interchangeably refer to either a qualitative measurement or to a quantitative measurement.

It has been found that ANFs show a strong neural response to a specific auditory stimulation (audio stimulation or stimulus), i.e. the auditory stimulation is able to evoke a highly synchronized ANF response across a population of ANFs and ANSs along the cochlea. The ANF response may be recorded through measurement of the neural activity of the brain by means of neural activity recording hardware as known in the art.

It may be appreciated that 100% ANF damage can evoke the same or a similar neural response (or lack thereof) as 100% IHC damage. Accordingly, if the present method determines 100% damage or loss, this may be interpreted that (i) at least a portion of the IHC still remains but that the ANF are completely gone (synaptopathy) or that (ii) the IHC are completely gone, including the ANF that are attached thereto. Accordingly, if the present method determines less than 100% damage or loss, for example 90%, this indicates that the at least a portion of the IHC still remain and that only the ANF and/or ANC are damaged. Reduced integrity of the IHC may occur when all ANS/ANF are completely abolished (i.e., a full cochlear synaptopathy, or a full IHC deafferentiation) or when IHCs themselves are lost (e.g. due to ototoxic drugs). One of ordinary skill in the art may thus appreciate that the determination of the integrity of ANS and/or ANF in a subject may be linked to the determination of the integrity of IHC in the same subject. The neural response to an auditory stimulation can be recorded by measuring the electrical activity of the brain. This activity is either mapped via invasive recording electrodes (in animals) or by means of Electroencephalography (EEG), in humans or animals alike. For EEG, a number of electrodes, referred to as an electrode array, are attached to the scalp of a subject that will record all (neural) activity as wave patterns. The EEG data may be processed to determine the integrity of ANFs and/or ANSs in subjects. The integrity may be determined for the whole or a subset of the ANF/ANS population.

Other functional neuroimaging techniques may also be used to record the neural response within the purposes of the present invention. For example, brain activity of a subject can also be mapped through Magnetoencephalography (MEG) or the electrocochleogram (EcochG). The skilled person understands that EcochG/MEG data can be processed in a way equivalent to embodiments describing EEG-data and application of the present auditory stimulation is not limited to any specific neuroimaging technique. Data from different neuroimaging and/or auditory test may also be combined to obtain more accurate or alternative results, such as determining damage to other auditory components, such as outer hair cell (OHC) damage.

An initial overview of various aspect of the invention is provided below and specific embodiments are then described in further detail. This initial overview is intended to aid readers in understanding the technological concepts more quickly, but is not intended to identify key or essential features thereof, nor is it intended to limit the scope of the claimed subject matter.

In addition, one of ordinary skill in the art understands, and based on a reading of this detailed description, would recognize that that the various aspects can be combined unless otherwise stated. As such, any specific embodiment of a specific aspect may be understood to constitute a specific embodiment of another aspect without the explicitly discussion thereof. For example, an embodiment of a system for determining for determining the integrity of auditory nerve fibers and/or auditory nerve synapses and/or inner hair cells in a subject also forms an embodiment of a computer-implemented method for determining the same, or an embodiment of a computer program configured for performing said computer-implemented method.

An aspect of the present invention relates to a computer-implemented method for determining the integrity of auditory nerve fibers and/or auditory nerve synapses in a subject, for example as described above, comprising the steps of:
  a) receiving brain activity data, preferably EEG or MEG signals, more preferably EEG signals, of the subject exposed to an auditory stimulation s(t), wherein the auditory stimulation s(t) comprises a carrier signal c(t) amplitude modulated by a non-sinusoidal periodic modulator m(t); and,
  b) determining from the brain activity data, a subject-specific degree of the integrity of the whole or a subset of the auditory nerve fibers and/or synapses;
preferably wherein the auditory stimulation s(t) comprises a carrier signal c(t) amplitude modulated by a non-sinusoidal periodic modulator m(t), which preferably has a rectangular waveform with a duty cycle d, wherein the duty cycle preferably is at least 10% and at most 40%.

An aspect of the present invention relates to a computer-implemented method for determining the integrity of auditory nerve fibers and/or auditory nerve synapses and/or inner hair cells in a subject, for example as described above, comprising the steps of:
  a) generating an auditory stimulation s(t), wherein the auditory stimulation comprises a carrier signal c(t) amplitude modulated by a non-sinusoidal periodic modulator m(t); exposing the subject to the auditory stimulation s(t); and, receiving brain activity data, preferably EEG or MEG signals, more preferably EEG signals, of the subject exposed to the auditory stimulation s(t); and,
  b) determining from the brain activity data, a subject-specific degree of the integrity of the whole or a subset of the auditory nerve fibers and/or synapses and/or inner hair cells;
preferably wherein the auditory stimulation s(t) comprises a carrier signal c(t) amplitude modulated by a non-sinusoidal periodic modulator m(t), which preferably has a rectangular waveform with a duty cycle d, wherein the duty cycle preferably is at least 10% and at most 40%.

An aspect of the present invention relates to a system for determining the integrity of auditory nerve fibers and/or auditory nerve synapses and/or inner hair cells in a subject, for example as described above, the system comprising:
  a sound generation and stimulation device for generating an auditory stimulation s(t);
  a neural activity screening hardware configured for recording the subject's neural response as neural activity data when said subject is exposed to an auditory stimulation s(t) generated by the sound generation and stimulation device; and,
  a processing unit connected to the recording hardware that is configured to
  a) receive the neural activity data of the subject exposed to the auditory stimulation s(t), and,
  b) determine from the neural activity data, a subject-specific degree of the integrity of the whole or a subset of the auditory nerve fibers and/or synapses and/or inner hair cells;
preferably wherein the auditory stimulation s(t) comprises a carrier signal c(t) amplitude modulated by a non-sinusoidal periodic modulator m(t), which preferably has a rectangular waveform with a duty cycle d, wherein the duty cycle preferably is at least 10% and at most 40%.

An aspect of the present invention relates to a system for determining the integrity of auditory nerve fibers and/or auditory nerve synapses in a subject, for example as described above, the system comprising:
- a sound generation and stimulation device for generating an auditory stimulation s(t);
- a neural activity screening hardware configured for recording the subject's neural response as neural activity data when said subject is exposed to an auditory stimulation s(t) generated by the sound generation and stimulation device; and,
- a processing unit connected to the recording hardware that is configured to
  a) receive the neural activity data of the subject exposed to the auditory stimulation s(t), and,
  b) determine from the neural activity data, a subject-specific degree of the integrity of the whole or a subset of the auditory nerve fibers and/or synapses;

preferably wherein the auditory stimulation s(t) comprises a carrier signal c(t) amplitude modulated by a non-sinusoidal periodic modulator m(t), which preferably has a rectangular waveform with a duty cycle d, wherein the duty cycle preferably is at least 10% and at most 40%.

An aspect of the present invention relates to a computer program, or a computer program product directly loadable into the internal memory of a computer, or a computer program product stored on a computer readable medium, or a combination of such computer programs or computer program products, configured for performing a computer-implemented method for determining the integrity of auditory nerve synapses (ANS), auditory nerve fibers (ANF) and/or inner-hair cells (IHC) in a subject, said computer-implemented method comprising the steps of:
  a) receiving brain activity data, preferably EEG or MEG signals, more preferably EEG signals, of the subject exposed to an auditory stimulation s(t), wherein the auditory stimulation s(t) comprises a carrier signal c(t) amplitude modulated by a non-sinusoidal periodic modulator m(t); and,
  b) determining from the brain activity data, a subject-specific degree of the integrity of the whole or a subset of the auditory nerve fibers and/or synapses and/or inner-hair cells (IHC);

An aspect of the present invention relates to a computer program, or a computer program product directly loadable into the internal memory of a computer, or a computer program product stored on a computer readable medium, or a combination of such computer programs or computer program products, configured for performing a computer-implemented method for determining the integrity of auditory nerve synapses (ANS), auditory nerve fibers (ANF) in a subject, said computer-implemented method comprising the steps of:
  a) receiving brain activity data, preferably EEG or MEG signals, more preferably EEG signals, of the subject exposed to an auditory stimulation s(t), wherein the auditory stimulation s(t) comprises a carrier signal c(t) amplitude modulated by a non-sinusoidal periodic modulator m(t); and,
  b) determining from the brain activity data, a subject-specific degree of the integrity of the whole or a subset of the auditory nerve fibers and/or synapses;

preferably wherein the auditory stimulation s(t) comprises a carrier signal c(t) amplitude modulated by a non-sinusoidal periodic modulator m(t), which preferably has a rectangular waveform with a duty cycle d, wherein the duty cycle preferably is at least 10% and at most 40%.

It has been found that when a non-sinusoidal amplitude modulator, and more preferably a rectangular waveform, is used, the EEG response to this sound stimulation, herein also referred to as the envelope-following response (EFR), is informative about the degree of damaged ANF fibers and/or damaged IHC. It has been found that when a non-sinusoidal amplitude modulator, and more preferably a rectangular waveform, is used, that the overall range of EEG response amplitudes is much greater.

The present method provides a robust, non-invasive, and possibly real-time, EEG-based test for the differential diagnosis of ANF and/or ANS and/or IHC damage, which may be applied for the diagnosis of synaptopathy and/or deafferentation, specifically in humans, and the method provides an objective test for speech-in-noise intelligibility. The method offers a quantifiable interpretation of reduced speech intelligibility in noise, a common complaint of older and noise exposed listeners.

The present method has been found to predict speech-in-noise intelligibility better than any present audiometric tests and is insensitive to Outer Hair Cell (OHC) damage, which also typically occurs with ageing and after noise exposure. The present method is therefore ideally suited for subjects with unknown mixtures of synaptopathy and OHC damage. OHC damage and synaptopathy co-exist in older hearing-impaired people. For a speech-in-noise test, synaptopathy dominates performance, as seen by the good correlation between the method's EEG response magnitude ($EFR_{PTN}$) metric and the intelligibility.

Due to the enhanced response magnitude and suggested approach to extract signal-related components from the EEG recordings, the present method can provide more robust diagnostic results (in comparison to other methods) for use in realistic clinical environment (e.g. without electrically shielded booth) and/or for use with portable EEG recording solutions. The present method can be used in a broader range of listeners to better quantify individual response differences, even in older listeners. Hence synaptopathy can be diagnosed in a larger population than possible with other methods.

In some preferred embodiments, the subject is a human or animal subject, preferably a human subject. In some embodiments, the human subject suffers from both synaptopathy and outer-hair cell (OHC) loss, for example through ageing or noise exposure. In some embodiments, the human subject suffers from inner-hair cell (IHC) loss, for example through medical treatment. In some embodiments, the human subject suffers from deafferentation of IHCs caused by ANS/ANF damage. In some embodiments, the human subject suffers from both synaptopathy and inner-hair cell (IHC) loss; for example, through ageing or noise exposure. In some embodiments, the human subject suffers from IHC damage without ANS/ANF damage; for example, due to the administration of specific medical treatments such as chemotherapy. The method has the advantage that it can be applied to most people of all ages and sorts of sensorineural hearing disorders and can be in different conditions: watching a movie, asleep, subconscious, non-verbal (e.g. neonates). Also, people undergoing cancer treatment may be considered. In some embodiments, the method is not used for people with severe IHC-ANF damage (e.g. genetic) requiring cochlear implants or for some people brainstem lesions. Several types of drugs may affect the EEG response, and this is preferably considered before the test.

In some embodiments, the human subject is at least 40 years old, for example at least 50 years old, for examples at least 60 years old. Elderly commonly exhibit some degree of hearing loss and are therefore particularly suitable for the present invention.

In some embodiments, the brain activity data is obtained from signals, preferably the signals are EEG (Electroencephalography) or MEG (Magnetoencephalography) signals, preferably EEG signals. Preferred and exemplary embodiments of EEG signals are also preferred and exemplary embodiments of MEG signals. The proposed stimulation paradigm enhances auditory evoked responses generated by the ANF and ANS population, which can be reflected by different tests. The present EEG and MEG methods can provide a non-invasive approach for hearing screening with high temporal precision. As used hereon, the term "EEG" also comprises EcochG (electrocochleogram), since this setup is basically an EEG recording from the ear-canal (tiptrodes) or transtympanic through the eardrum (needs clinical setup).

The auditory stimulation s(t) comprises a carrier signal c(t) amplitude modulated by a non-sinusoidal periodic modulator m(t). Preferably, the audio stimulation s(t) is an external audio stimulation. The external audio stimulation may be generated by a sound generation and stimulation. Additionally or alternatively, the auditory stimulation s(t) may be provided via bone-conduction devices (vibration on the temporal bone). Audiograms may be recorded via bone-conduction headphones as well.

It has been found that ANFs show an enhanced evoked response in particular to the rectangular wave. An auditory stimulus with a rectangular wave is thus able to evoke a highly synchronized ANF response across a population of ANFs and ANSs along the cochlea, and hence stimulates increased brain activity, which may be recorded as stronger EEG or MEG signals. When certain ANF types, or a number of ANFs and/or ANSs, are absent or non-functional, the brain activity will be reduced, resulting in a weaker EEG or MEG signals. The percentage of AN fiber and synapse loss can be quantified when applying the present data analysis method.

In some preferred embodiments, the non-sinusoidal amplitude modulator m(t) has a rectangular waveform.

The envelope of a rectangular wave may have an approximately rectangular shape. As used herein, such an audio stimulation is referred to as a "rectangular wave". The smooth curve outlining the extremes of the waveform is referred to as the envelope of said waveform. By varying the slope parameters of a rectangular wave within the $\delta_{max}$ range, the envelope may encompass a range of varying non-sinusoidal waveforms, such as a square wave (high slope), triangular (low slope), trapezoidal, exponential, and so on. The rectangular wave's parameters and its envelope shapes are detailed further in Example 1 with reference to FIG. 3A and FIG. 3B. As used herein, the term sinusoidal waveform refers to a waveform that has an essentially "sinusoidal-like" shape as understood in the art. Consequently, the term non-sinusoidal waveform refers to any waveform which does not fall under the former definition of a sinusoidal waveform. Also, an auditory stimulus comprising a carrier signal c(t) amplitude modulated by a sinusoidal periodic modulator is referred to as a sinusoidal amplitude-modulated (SAM) stimulus. SAM stimulations have been described in the art to mimic the fast-changing temporal features in speech and species-specific vocalizations.

Figure 3A:
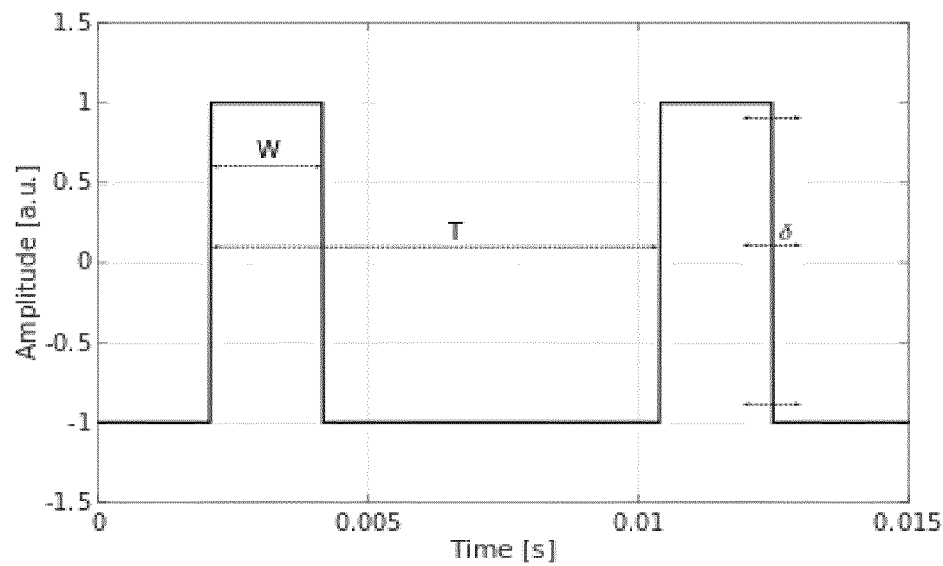
FIG. 3A is an exemplary periodic modulator m(t) with duty cycle d=W/T and δ=0. T represents the period of the modulator and 1/T the modulation frequency $f_m$. Examples of possible variations of the envelope shape within the $δ_{max}$ range are visualized in FIG. 3B.
Figure 3B:
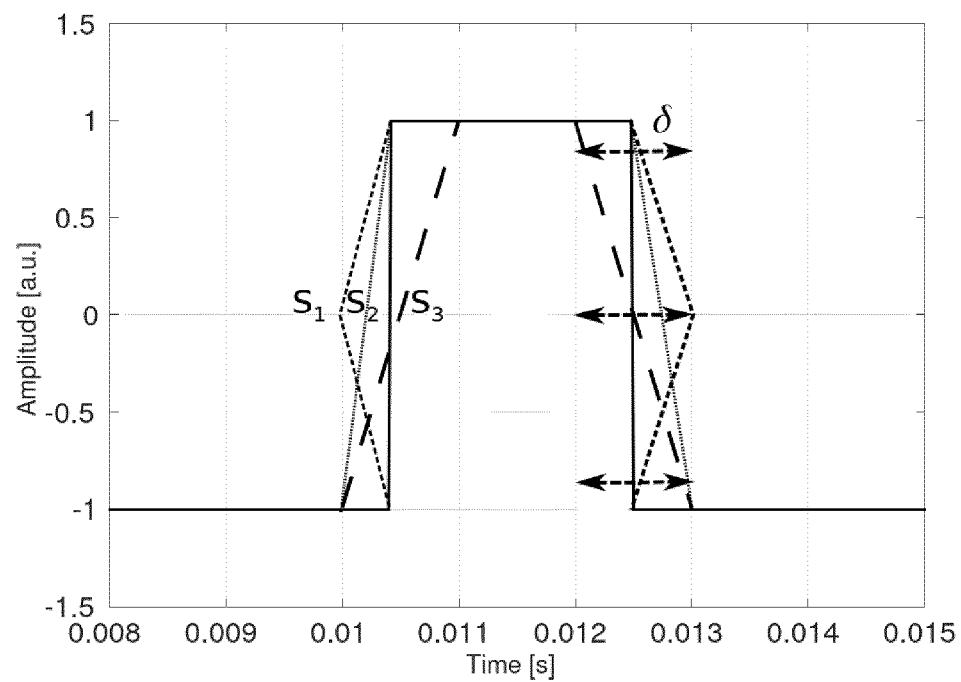
FIG. 3 illustrates an exemplary method of generating an auditory stimulation according to a preferred embodiment of the present invention. In particular.
FIG. 3C is an auditory stimulation s(t) created by modulating a pure-tone carrier signal c(t) with the rectangular modulator m(t) of FIG. 3A.
FIG. 3D is an auditory stimulation s(t) created by modulating a broadband noise carrier signal c(t) with the rectangular modulator m(t) of FIG. 3A.

As used herein, the term rectangular waveform refers to a waveform that has an essentially rectangular shape but also includes minor variations (defined by the slope deviation window $\delta$), as illustrated in FIG. 3A and FIG. 3B. For example, shapes S1, S2, and S3 in FIG. 3B are all considered "rectangular waveforms" with a deviation $\delta$ within $0 \leq \delta \leq \delta_{max}$. FIG. 3A shows a rectangular envelope shape with $\delta=0$ and trapezoidal shape S3 in FIG. 3B shows another example with $\delta$ different from 0. The rectangular waveform is a non-sinusoidal waveform. Also, an auditory stimulus comprising a carrier signal c(t) amplitude modulated by a rectangular periodic modulator is referred to as a rectangular amplitude-modulated (RAM) stimulus. The advantages of using a non-sinusoidal waveform over a sinusoidal waveform are discussed below.

The inventors have found that the speed at which the auditory stimulus envelope rises may be advantageous with respect to the differential sensitivity of the used marker to auditory nerve (AN) deficits. The rectangular waveform as defined above has a fast-rising envelope that can bring the AN directly into its sustained regime and yields insufficient time for the outer-hair cell (OHC)-mediated cochlear response to influence the AN firing. Consequently, the degree of OHC damage will not affect the AN response and the AN integrity can be determined differentially, irrespective of whether OHC damage is also present.

In comparison, slowly rising (sinusoidal or "sinusoidal-like") envelopes allow time for the OHC to modulate the AN response and influence the used marker strength. For those stimuli, it is not possible to derive a % reduction of ANF population from the strength of the neural response amplitude, when OHC damage is present. As such, sinusoidal waveforms are unable to e cycle of at least 10 voke a neural response that is not influenced by OHC damage and hence are unsuitable for determining the AN integrity of e.g. elderly which typically exhibit some degree of OHC damage.

In some preferred embodiments, the non-sinusoidal amplitude modulator m(t) has a rectangular waveform with a duty cycle d, defined as d=W/T where d is the duty cycle, W is the pulse width (pulse active time), and T is the total period of the signal, wherein the duty cycle can range from 1% (single pulse) to 100% (continuous stimulation).

In some preferred embodiments, the duty cycle d is at least 10%, preferably at least 15%, preferably at least 20%, even more preferably about 25%, for example 24% or 26%. The inventors have found that a stimulus envelope with a duty cycle of at least 10% may allow sufficient time for AN exocytosis to build up and release neurotransmitter material to yield a stable sustained response. For "click" stimuli (duty cycle below 10%), the plateau duration is too short, and this compromises a strong sustained AN response to the stimulation rate.

In some preferred embodiments, the duty cycle d is at most 40%, preferably at most 35%, preferably at most 30%, even more preferably about 25%, for example 24% or 26%. The inventors have found that for longer duty cycles, above 40%, the AN adaptation time-constants may come into action and reduce the overall sustained AN firing efficiency. At the same time, the neural response may start showing multiple maxima during the stimulus plateau duration (yNH trace in FIG. 14h vs FIG. 14i), and this may compromise the strength of the marker to the original stimulus modulation frequency, therefore leading to a neural response which is less sensitive to detecting individual differences in AN synapse/fiber population integrity (compare also RAM25 and RAM50 EFR strengths in FIG. 15).

In some preferred embodiments, the duty cycle is at least 10% and at most 40%, preferably at least 15% and at most 35%, preferably at least 20% and at most 30%, even more preferably about 25%, for example 24% or 26%. Further to the above-described duty cycles, the inventors have found that a stimulus envelope with a duty cycle between 20% and 30%, for example about 25%, may evoke improved clear single unit auditory-nerve responses and ASSR/EFR waveforms compared to the auditory stimulation of the art. Comparative model simulation may be found in FIG. 14, which is discussed further in Example 6.

The preferred upper limit for the deviation $\delta_{max}$ is defined as a half the duty cycle d (d=W/T, see FIG. 3A). In some preferred embodiments, $\delta$ is at most $\delta_{max}$=d/2 (or 50%*d), and can have values between 0 and $\delta_{max}$. In some preferred embodiments, the non-sinusoidal amplitude modulator m(t) has a rectangular waveform with a slope deviation window $\delta$ in the range of 0 and $\delta_{max}$; wherein $\delta_{max}$=0.5*d.

The slope deviation window $\delta$ is preferably 0, and can be maximally $\delta_{max}$, different modulator shapes can be defined within the $\delta$ window (FIG. 3B shows several possibilities).

In some embodiments, $\delta_{max}$ is preferably at most 0.4*d, preferably at most 0.3*d, preferably at most 0.2*d, preferably at most 0.1*d, preferably at most 0.05*d, preferably at most 0.02*d, for example at most 0.01*d, most preferably 0.00.

In some more preferred embodiments, the non-sinusoidal amplitude modulator m(t) has a rectangular waveform with $\delta$=0. A rectangular waveform may refer to a range of stimulus envelope shapes falling within the parameter space defined by the following formula:

$$m(t)=\text{square}(2*\pi*f_m*t+\varphi_m, d),$$

wherein $f_m$ refers to the modulation frequency, $\varphi_m$ to the modulation phase shift, and d to the duty cycle (in %). The rectangular wave's parameters and its variations are detailed further in Example 1 with reference to FIG. 3A and FIG. 3B.

In some embodiments, the non-sinusoidal periodic modulator m(t) has a period of $2\pi$. A period of $2\pi$ has the advantage that the response can easily be analysed using Fourier Transformation.

In some embodiments, the modulation frequency $f_m$ (defined as 1/T) of the non-sinusoidal amplitude modulator m(t) is at least 50 Hz, preferably at least 60 Hz, preferably at least 70 Hz, preferably at least 80 Hz, preferably at least 90 Hz, preferably at least 100 Hz, preferably at least 110 Hz, preferably about 120 Hz.

In some embodiments, the modulation frequency $f_m$ is at most 1000 Hz, preferably at most 800 Hz, preferably at most 600 Hz, preferably at least 400 Hz, preferably at least 300 Hz, preferably at most 200 Hz, preferably at most 150 Hz, preferably about 120 Hz.

In some embodiments, the modulation frequency $f_m$ is at least 50 Hz and at most 1000 Hz, preferably at least 60 Hz and at most 800 Hz, preferably at least 70 Hz and at most 600 Hz, preferably at least 80 Hz and at most 400 Hz, preferably at least 90 Hz and at most 300 Hz, preferably at least 100 Hz and at most 200 Hz, preferably at least 110 Hz and at most 150 Hz, preferably about 120 Hz. Lower modulation frequencies (<50 Hz, preferably <80 Hz) evoke both cortical and subcortical EEG responses and are hence less sensitive to synaptopathy. Higher modulation frequencies (>80 Hz) generate subcortical responses and are hence more sensitive to ANF and ANS degradation. It may be appreciated that when the modulation is too high and the carrier tonal, resolved harmonics may occur in the cochlea; so the optimal modulation frequency parameters depend on the carrier frequency.

In some embodiments, the modulation phase shift $\varphi_m$ of the non-sinusoidal amplitude modulator m(t) is at least 0 and at most $2\pi$, for example $3\pi/2$. If there is no slope variation ($\delta$=0), then there is no benefit of using a different phase, but if there is a slope variation ($\delta$ not 0), there is a benefit of starting with a shifted phase such that the instantaneous amplitude at the start of the envelope waveform equals 0.

In some embodiments, the duty cycle d of the non-sinusoidal amplitude modulator m(t), defined as d=W/T where d is the duty cycle, W is the pulse width (pulse active time), and T is the total period of the signal, is at least 10%, preferably at least 15%, preferably at least 20%, for example about 25%. In some embodiments, the duty cycle is at most 40%, preferably at most 35%, preferably at most 30%, for example about 25%. In some embodiments, the duty cycle is at least 10% and at most 40%, preferably at least 15% and at most 35%, preferably at least 20% and at most 30%, for example about 25%. The inclusion of a duty cycle may ensure the presence of silence gaps between sequential auditory stimuli. This may allow for the stimulated ANFs to return to their resting state and recover, such that for the subsequent stimulus, the evoked response may stay at a 'maximum'. In other words, if no silence gaps are included, the following stimulus may result in a reduced 'maximum' response from the ANFs and ANSs due to the ANF adaptation properties. The shorter the duty cycle, the more synchronous the ANF response can get. For short duty cycle values, such as 25%, there is a longer interpeak interval for the same modulation frequency. If the duty cycle becomes too short (i.e. <10%), the ANFs do not receive a long enough sustained stimulation to fire according to their 'maximum' state (this property relates to the dynamics of the neurotransmitter release across the synapse).

In some embodiments, the carrier signal c(t) comprises one or more pure tones. In some embodiments, the carrier signal c(t) comprises noise or speech. A pure-tone carrier can evoke a frequency specific response to identify tonotopic configuration of the sensorineural hearing loss profile. Pure-tone carrier signals may provide a more frequency-specific assessment, e.g. the integrity of the ANF, ANS and/or IHC may be determined for different octaves. With speech-like carriers, the frequency range of ANF, ANS and/or IHC relevant for speech intelligibility may be targeted.

In some embodiments, the carrier frequency is broadband/band-limited noise. Broadband noise carrier signals can excite the whole population of AN fibers and/or synapses if there is no need for frequency-specific assessment. Exciting the whole hearing range at the same time may be useful for a quick screening test. Additionally, band-limited noise may be used as the carrier which allows for assessing of synaptopathy in the frequency region limited by the cut-off frequencies of the noise. Broadband carriers typically give more robust EEG responses than narrow-band noise responses.

In some embodiments, the carrier frequency $f_c$ of the carrier signal c(t) is at least 500 Hz, preferably at least 1000 Hz, preferably at least 1500 Hz, preferably at least 2000 Hz, preferably at least 2500 Hz, preferably at least 3000 Hz, preferably at least 3500 Hz, preferably about 4000 Hz.

In some embodiments, the carrier frequency $f_c$ is at most 32000 Hz, preferably at most 24000 Hz, preferably at most 16000 Hz, preferably at least 12000 Hz, preferably at least 8000 Hz, preferably at most 6000 Hz, preferably at most 5000 Hz, preferably about 4000 Hz. In some embodiments, the carrier frequency $f_c$ is at least 500 Hz and at most 32000 Hz, preferably at least 1000 Hz and at most 24000 Hz, preferably at least 1500 Hz and at most 16000 Hz, preferably at least 2000 Hz and at most 1200 Hz, preferably at least 2500 Hz and at most 8000 Hz, preferably at least 3000 Hz and at most 6000 Hz, preferably at least 3500 Hz and at most 5000 Hz, preferably about 4000 Hz. It may be appreciated that the optimal carrier frequency $f_c$ also depends on the species of subject, e.g. rodents have a higher high-frequency hearing range than humans.

In some embodiments, the carrier phase shift $\varphi_c$ of the carrier signal c(t) is at least 0 and at most $2\pi$, for example 0.

In some embodiments, the modulation depth md is at least 80%, preferably at least 85%, preferably at least 90%, for example about 95% or about 100%. In some embodiments, the modulation depth md is at most 100%, preferably at most 99%, preferably at most 97%, for example about 95%. In some embodiments, the modulation depth md is at least 80% and at most 100%, preferably at least 85% and at most 99%, preferably at least 90% and at most 97%, for example about 95%. Such a modulation depth avoids silence gaps in each modulation cycle. Typically, a higher md % (up to 100%) may evoke a higher ANF response. Below 80%, the ANF rate response may start degrading, but might still be measurable.

In some embodiments, the received brain activity data, for example EEG signals, of the subject are received in the time domain. In some preferred embodiments, the received EEG signals of the subject are received in the time domain as a recorded electrical potential between two EEG electrodes.

The time-domain signal will preferably be sampled via an EEG amplifier. Sampling frequencies can range from 500 Hz to 96 kHz depending on the amplifier and the species tested. Preferably the sampling frequency is kept sufficient for analysis such that the highest targeted frequency, for example minimum $2*f_m$ and maximum $4*f_m$, in the EEG recording is less than sampling frequency/2 (i.e. Nyquist—Shannon sampling theorem).

In some embodiments, the EEG signals may be obtained by placing EEG electrodes, preferably on the scalp, around the ear(s), and/or inside the ear-canal(s) of the subject.

The electrode position is preferably adapted to capture the dipole source generated by the population of auditory nerve fibers or auditory brainstem. In some embodiments, the electrodes are placed to measure the AN fiber and synapse population in a single ear. In some embodiments, the electrodes are placed to measure the AN fiber and synapse population in both ears simultaneously. Preferably, the electrodes comprise a recording electrode placed on top of the head (Cz, vertex top of the head) or on the front (Fz), and/or a reference electrode placed on the mastoid or earlobe. The EEG electrodes can be inverted and can comprise any type of EEG electrodes, for example stick-on wet or dry EEG electrodes or tiptrodes placed inside the ear-canal.

In some embodiments, step b) comprises the step of:
b1) pre-processing the brain activity date, preferably the EEG or MEG signal, preferably EEG signal.

In some preferred embodiments, step b1) comprises one or more steps from the list comprising: averaging of EEG recordings to a number of stimulus repetitions, noise-reduction, filtering (low-pass, band-pass and/or notch filters), artefact rejection, baseline correction, epoching, and/or windowing.

In preferred embodiments, step b) comprises the step of:
b2) transforming the brain activity data, preferably the received EEG or MEG, preferably EEG, signals into the frequency domain (FD).

In some embodiments, step b2) transforms the brain activity data, such as EEG signals, that have been pre-processed in step b1).

In some preferred embodiments, step b2) comprises applying a (discrete) Fourier Transform (dFT) on a time-segment of the brain activity data, such as the EEG signals, to the auditory stimulus.

In some embodiments, step b) comprises the step of:
b3) determining a subject-specific noise floor on the brain activity data, such as EEG recordings.

In some preferred embodiments, the subject-specific noise-floor is obtained from the frequency domain transformation performed in step b2), or via bootstrapping/resampling.

In some preferred embodiments, step b3) comprises determining the average noise-floor across at least two, preferably at least 3 or more, for example 10, frequency bins around the stimulus modulation frequency and harmonics of the modulation frequency, and subtracting the average noise-floor estimate from the frequency domain (FD) transformed signal at the stimulus modulation frequency and its harmonics. Such a step may yield relative and noise corrected response magnitudes.

In some embodiments, step b) comprises the step of:
b4) determining the response magnitude at the frequency F0 corresponding to stimulus the modulation frequency $f_m$.

In some preferred embodiments, step b) comprises the step of:
b4') determining the response magnitude at the frequency F0 corresponding to the stimulus modulation frequency $f_m$ and one or more frequencies F1 to Fn which are harmonics of the modulation frequency.

As used herein, the term "F0" refers to the modulation frequency of the envelope. As used herein, the terms "F1, F2, . . . Fn" refer to the first harmonic, second harmonic, and n-th harmonic, respectively. In some preferred embodiments, n is at least 1, preferably at least 2, for example at least 3, 4, 5, 6, 7, 8, 9, or 10, and so on.

In some preferred embodiments, the one or more frequencies which are harmonics of the modulation frequency include at least 3 and more preferably at least 4. For human subjects Harmonics F1-F4 may be regarded as the most significant harmonics above the noise floor (NF) estimate, while F5-Fn may be less pronounced in EEG recordings. However, the number significant harmonics may be dependent on species. As used herein, "significant" harmonics or peaks may refer to the number of harmonics producing pronounced recording, which may be processed for determining a response magnitude.

In some embodiments, the significant harmonics are the harmonics that are visible in the Frequency Domain. In some preferred embodiments, the significant harmonics are the harmonics that are 2 standard deviations (p=0.05) above the noise floor.

In some preferred embodiments, step b) comprises the step of:
b4") determining the response magnitude at the frequency F0 corresponding to the stimulus modulation frequency $f_m$ and all frequencies which are harmonics of the modulation frequency, preferably all significant frequencies which are harmonics as defined above.

Typically, the more harmonics are included, the better for the signal reconstruction and thus the accuracy of the method. As such, the response magnitude can be determined from all harmonics of the modulation frequency Fn, preferably above the noise floor (NF).

It has been found that in the above method and embodiments thereof, the EEG response magnitude (which was adopted as a measure of the integrity of AN fibers and/or synapses in the subject) showed better correlation with psychoacoustic metrics of hearing of performance, e.g. speech-in-noise reception threshold. The more harmonics can be included in the EEG analysis, the more accurately the corresponding individual speech-in-noise reception threshold can be determined.

In some preferred embodiments, step b4), b4') or b4") is performed in the frequency domain (FD) obtained in step b2).

In some embodiments, the absolute magnitude is determined in step b4) or b4'), preferably at the frequency corresponding to the modulation frequency of the envelope and one or more frequencies which are harmonics of the modulation frequency.

In some embodiments, the magnitude and phase are determined in step b4), b4') or b4"), preferably at the frequency corresponding to the stimulus modulation frequency and one or more frequencies which are harmonics of the modulation frequency. Subtracting the noise-floor (NF) from the spectral peak values at modulation frequencies and harmonics may allow for operating directly with signal values without confound factors related to the individual NF fluctuations. Typical NF fluctuations may be related to general biophysical noise, head size, age, etc. Accounting for the phase information at modulation frequency and harmonics may allow for restoring response amplitude from the raw EEG recording more precisely due to the summation of all available harmonics according to the phase information for each harmonic. The response magnitude can be obtained for example by summing the signal energy from the previous step in the Frequency Domain.

The response magnitude can alternatively be obtained by estimating the amplitude of a reconstructed signal (e.g. via inverse (discrete) Fourier Transform (iFT), with or without original phase information) which only includes FD energy from the fundamental frequency and/or harmonics (with or without noise-floor correction) in the reconstruction.

In some preferred embodiments, step b), preferably in b4), b4') or b4"), comprises the steps of:
  identifying one or more peaks, preferably at least 2 peaks, preferably all significant peaks above the noise floor, corresponding to the modulation frequency and its harmonics in the frequency domain (F1 to Fn);
  reconstructing from the identified peaks a reconstructed time domain waveform, preferably by inverse Fourier Transform (iFT); and,
  measuring from the reconstructed time domain waveform, a magnitude of the reconstructed signal;
wherein the magnitude is a measure of the integrity of AN fibers and/or synapses in the subject.

In some preferred embodiments the magnitude is half of the peak-to-peak amplitude of the reconstructed time-domain signal. The skilled person understands that the magnitude may also be quantified as root mean square (rms) of the time-domain signal, or other known data processing techniques.

In some preferred embodiments, step b), preferably in step b4'), comprises the step of:
  identifying at least 2 peaks in the frequency domain, preferably all significant peaks above the noise floor, comprising at least:
    the modulation frequency F0 of the stimulus; and,
    one or more harmonics of the modulation frequency (F1 to Fn);
  reconstructing from the identified peaks a reconstructed time domain waveform, preferably by inverse Fourier Transform (iFT); and,
  measuring from the reconstructed time domain waveform, a magnitude of the reconstructed signal;
wherein the magnitude is a measure of the level of the integrity of AN fibers and/or synapses in the subject.

It has been found that the method yields a larger response amplitude, which captures more aspects of the recorded signal. After the discrete Fourier Transform (FT) of the preprocessed, averaged and epoched EEG recording, both the individual noise floor and spectral peaks at the frequency of the modulators and its harmonics can be identified. The energy of these peaks above the noise floor may be obtained in the Frequency Domain but is preferably part of a reconstructed signal which is calculated through inverse dFT. The magnitude of the time domain signal is defined as the waveform invoked response magnitude and is the EEG marker for ANF and ANS integrity, as developed by the present methods.

Depending on the quality of the EEG amplifier and the EEG electrodes, the stimulus is preferably repeated anywhere between at least 10 to 4000 times to achieve a reliable signal that significantly exceeds the biological/electrical noise floor. The more repetitions are required, the longer the recording lasts. For animals, around 30 may be sufficient due to better electrode contact, whereas for humans at least 400 repetitions may typically be required to increase the averages. It is possible to achieve the same signal quality by recording fewer averages, but using different electrode types (e.g. tiptrodes inserted in the ear canal). Alternatively, more recording electrodes can be used to achieve better signal-to-noise ratios (as an average signal across several electrodes) with fewer stimulus repetitions. In preferred embodiments the stimulus is repeated between at least 400 to at most 2000 repetitions. This subrange may be suitable for human recordings to obtain a balance between the recording time and the signal quality for long stimulus epochs. It may be appreciated that the present method requires fewer repetitions than other methods due to the stronger evoked response.

The term "determining the integrity" can refer to both a qualitative measurement and to a quantitative measurement. In some embodiments, the "subject-specific degree of ANF/ANS integrity" provides a qualitative result; e.g. synaptopathy is present or not, or synaptopathy is more (or less) present (e.g. than in another subject such as a "healthy" subject, or than in a previous measurement of the same subject). In some embodiments, the subject-specific degree of ANF/ANS integrity provides a quantitative result; e.g. the degree of synaptopathy is defined as a % of AN synapse and fiber loss.

Depending on the stimulus specifics, the method can either target different subtypes of AN fibers (low, medium, or high spontaneous rate) or the method can target all AN fiber types and ANS in a specific frequency region (i.e. between 2-4 kHz). This allows the method to measure the integrity of the ANF/ANS population within a targeted frequency region of interest.

In some embodiments, the method comprises the step of:
  b') determining from the brain activity data, preferably EEG or MEG signals, a subject-specific degree of integrity of the AN fiber and synapse population; preferably quantifying from the brain activity data, preferably EEG or MEG signals, a subject-specific degree of the AN fiber and synapse population.

In some embodiments, the method comprises the step of:
  b") determining from the brain activity data, preferably EEG or MEG signals, a subject-specific degree of integrity of a subset of the AN fiber and synapse population; preferably quantifying from the brain activity data, preferably EEG or MEG signals, a subject-specific degree of the integrity of a subset of the AN fiber and synapse population.

In some embodiments, the subset is frequency-specific, i.e. the carrier may be tonal, targeting specific frequencies within the hearing range, or broadband to cover the whole or a broader part of the hearing range with one stimulus (e.g. using a band cut-off). In such embodiments, the method only targets the health of a subset of the ANF/ANS population in the targeted frequency region. This has the advantage that not just a yes-no answer is provided, but that the % loss can offer a more sensitive diagnostic tool across the targeted frequency range.

In some embodiments, the subset is subtype-specific, i.e. the carrier may be tonal, targeting specific ANF subtypes within the ANF population, such as the Low (LSR), medium (MSR) and high spontaneous rate (HSR) ANFs, by changing the modulation depth and of the auditory stimulus. In such embodiments, the method only targets the health of a subset of the ANF population of the targeted ANF subtype.

In some embodiments, the method as described herein is for quantifying a loss-percentage degree when the ANF and/or ANS population is suspected to be comprised. The ANF and/or ANS population may be compromised through hearing damage (e.g. through ageing, noise overexposure, genetic loss, and/or ototoxic agents).

The present invention also relates to the use of the method as described herein, and embodiments thereof, as a screening method for the presence of synaptopathy in a subject. In some embodiments, the method can be used to identify whether a magnitude above the noise floor is observed or not. For example, if the response is found to have a signal-to-noise ratio higher than a pre-determined value, and/or if the response is found to have a magnitude higher than a pre-determined value, the subject may be found to not suffer from synaptopathy. Conversely, if the response is found to have a signal-to-noise ratio lower than a pre-determined value, and/or if the response is found to have a magnitude lower than a pre-determined value, synaptopathy may be found to be present.

The present invention also relates to the use of the method as described herein, and embodiments thereof, as a screening method for quantifying a degree of synaptopathy (i.e. ANF/ANS loss) in the subject. Preferably, this degree of AN fiber and/or synapse loss is defined as a % of the total population in healthy subjects, i.e. a subject with normal hearing. The AN fiber and synapse loss may also be compared to specific subgroups of subjects, such divided by age, sex, profession, and so on.

In some embodiments, the parameters of the stimulus are modified to target one or the other subpopulation. There are three types of nerve fibers with different level-specific properties. Low (LSR), medium (MSR) and high spontaneous rate (HSR) ANF fibers. It has been found that the methods as described herein are particularly sensitive to all spontaneous rate fiber types. Targeting of a subpopulation can be done by changing the modulation depth of the stimulation paradigm, for narrow-band stimuli. (e.g. decreasing modulation depth of the signal s(t) may enhance selectivity to LSR fiber loss).

The present invention also relates to the use of the method as described herein, and embodiments thereof, as a screening method for quantifying a degree of hearing loss in the subject. Preferably, the degree of AN fiber and synapse loss is defined as a % of damage. Preferably, the % of damage is combined with another diagnostic marker which can determine the % degree of OHC damage. It has been found that the methods as described herein allow for distinguishing between OHC and ANF damage, thereby allowing for a more accurate determination of the sensorineural hearing loss and its separation into a sensory (OHC) and neural (ANF/ANS) loss component.

The degree of AN fiber and synapse integrity and/or IHC integrity can be quantified using various methods, described hereunder.

In some embodiments, the degree of synaptopathy can be quantified using a first quantification method. In such a first quantification method, the method as described herein is combined with a computational model (i.e. simulations) in which ANF parameters can be modified and in which auditory brainstem EEG sources can be simulated.

In some embodiments, the degree of synaptopathy can be quantified using a second quantification method. In such a second quantification method, the method as described herein is combined with data from a large reference dataset of listeners (e.g. EEG-data) with and without hearing pathologies.

In some embodiments, the degree of synaptopathy can be quantified using a third quantification method. In such a third quantification method, the method as described herein is combined with data from a computational model and data from a large reference dataset. In some embodiments, the method as described herein wherein a subject's EEG response to the present auditory stimulus is experimentally measured using an EEG set-up, is inserted into a biophysical model of the auditory periphery. For example, individual parameters of ANF/ANS damage derived from the EEG response may be inserted in a biophysical model of the auditory periphery to simulate individual auditory processing. The model may include data from, e.g., simulated and/or experimental frequency and/or type-specific ANF/ANS damage profiles. In some embodiments, the ANF/ANS damage profiles are determined based on experimental data (e.g. EEG recording). The ANF/ANS data may be subdivided based on a subset of the ANF/ANS population; this may include high spontaneous rate fibers (HSR), medium spontaneous rate fibers (HSR), and low spontaneous rate fibers (LSR).

In some embodiments, possible EEG response for whole or a subset of the ANF/ANS population may be simulated to obtain a predicted auditory response to the auditory stimulus (e.g. auditory EEG responses, auditory sound perception, cochlear, ANF and brainstem processing). Calculation of the response amplitudes (from the simulations) of all possible EEG responses may allow for creating various auditory profiles corresponding to the different ANF profiles or other input parameters. The auditory profiles may be further subdivided using category-based parameters, based on e.g. age, sex, etc., or other parameters. The calculated profiles may be stored on or made available through a database.

In some embodiments, the processed subject's EEG response data may be interpreted using the predictive simulation data to assign the subject to an auditory profile. The assigning can be performed automatically by means of a matching algorithm. The assigned profile is preferably based on the best possible match between the simulated and recorded EEG response amplitudes. Based on the assigned auditory profile the integrity of the subject's ANFs/ANSs and/or IHC may be determined. It has been found that LSR and MSR fibers and, especially, their afferent synapses, are the most vulnerable elements during the noise-induced hearing loss. Histological studies have also shown that LSR fibers and synapses disappear first.

In some embodiments, the method for determining the integrity of ANF/ANS and/or IHC of a subject may be expanded to also determine the outer-hair cell (OHC) damage degree of said subject.

In some embodiments, the biophysical model of the auditory periphery may be expanded to also include, e.g., simulated and/or experimental frequency specific OHC damage profiles. The OHC damage profiles can be determined based on experimental data, i.e. estimates of frequency-specific OHC damage (e.g. derived from audiogram test, otoacoustic emissions). Alternatively, the OHC damage profiles can be kept variable such that the matching algorithm can be optimized both for ANF and OHC profiles simultaneously.

In some embodiments, the method for determining the integrity of AN fibers and/or synapses and/or the integrity of IHC and/or damage to the OHCs of a subject may be used to modify the desired auditory responses to sound for said subject. The difference between the desired auditory response and the auditory response corresponding to the individual AN/OHC damage profile may be used to optimize a signal processing algorithm for auditory devices, such as cochlear implants or hearing aids.

In some preferred embodiments, (individualized and/or simulated) auditory responses to sound (e.g. auditory EEG responses, sound perception, cochlear, ANF and brainstem processing) are used to adjust specific aspects of the sound stimulus in the time or frequency domain, preferably to adjust the intensity and/or temporal envelope shape (for example onset sharpening/envelope depth enhancement). The desired auditory responses to sound (e.g.

Normal-hearing or auditory feature enhanced responses) can be simulated or recorded. The difference between the desired auditory response and the auditory response corresponding to a subject's AN fiber and synapse integrity and/or IHC integrity and/or OHC damage profile may then form a feedback loop to a processing unit of auditory devices. For example, the feedback loop can be used for optimizing the signal processing algorithm to adjust the sound stimulation in these devices.

The present invention also relates to a method for modifying a desired auditory response to sound for a subject. The method preferably comprises the steps of:
  performing the method as described herein to determine the subject specific auditory nerve fiber and/or synapse (and optionally OHC) auditory damage profile; and,
  including the auditory profile in an auditory periphery model to simulate auditory responses to any acoustic stimulus.

In some embodiments, the method comprises the steps of:
  comparing the individually simulated auditory response to a desired auditory response, for example wherein the desired response may be experimental or simulated, for example the response from a normal-hearing subject or a response with enhanced features.

In some embodiments, the method comprises the steps of:
  including a signal-processing algorithm to adjust the sound stimulus such that the simulated auditory response matches the desired auditory response. This matching algorithm may, for example, end up filtering, onset sharpening, compressing and/or expanding the audio stimulus.

The present invention also relates to a method for generating a personalized mathematical auditory periphery model of a subject for processing sound for an auditory device, the method comprising the steps of:

determining the integrity of AN synapses and/or fibers and/or IHC in the subject according to the method as described herein, and embodiments thereof;
  optionally, determining the outer hair cell damage component; and,
  generating a personalized mathematical model for processing sound for an auditory device based on the integrity of AN synapses and/or fibers and/or IHC in the subject, and optionally the outer hair cell damage component.

In some embodiments, the method comprises configuring the auditory device, such as cochlear implants or wearable hearing aids. Preferably, the method comprises adjusting the sound stimulus to minimize the difference between a desired auditory response (for example a normal-hearing response or an auditory feature enhanced response) and an auditory response simulated from the personalized mathematical model for processing sound.

The present invention also relates to a computer-implemented method for comparing the degree of hearing loss caused a combination of ANF/ANS damage and by Outer Hair Cell (OHC) damage or loss in a subject.

The method can be based on the degree of AN fiber and synapse and/or IHC integrity as obtained by the methods as described herein. The method can be combined with another EEG marker to form a sensorineural hearing loss map with differential sensitivity to both aspects (AN and OHC) of sensorineural hearing loss.

In some preferred embodiments, the method for comparing degree of hearing loss caused by synaptopathy and by Outer Hair Cell (OHC) loss in a subject, comprises the steps of:
  performing the method as described herein, or embodiments thereof, to quantify the degree of ANF/ANS damage, preferably the degree of synaptopathy, in the subject;
  obtaining a marker, preferably an EEG-marker, of the subject that is only sensitive to Outer Hair Cell (OHC) damage; to quantify the degree of outer Hair Cell damage in the subject; and,
  mapping the degree of ANF/ANS damage and the degree of Outer Hair Cell damage on a 2-dimensional graph.

The marker for OHC damage may be an EEG-marker. Alternatively, the marker is obtained by performing another test on the subject that is only sensitive to Outer Hair Cell (OHC) damage (e.g. audiogram, otoacoustic emission thresholds). This graph preferably forms a sensorineural hearing loss map. For example, the map could comprise the obtained EEG marker for synaptopathy on the X-axis (or the Y-axis) and an EEG marker that is exclusive sensitive to OHC damage on the Y-axis (or X-axis).

Using the above method, various individuals could be placed on the sensorineural hearing loss map to facilitate the decision for treatment options.

In some embodiments, the method is frequency specific. In such embodiments, the method only targets the health of a subset of the ANF/ANS population in the targeted frequency range of hearing. This has the advantage that a frequency specific sensorineural hearing loss map can be obtained.

The present invention also relates to a computer program, or a computer program product directly loadable into the internal memory of a computer, or a computer program product stored on a computer readable medium, or a combination of such computer programs or computer program products, configured for performing the method as described herein, or embodiments thereof.

The present invention also relates to a system for determining the integrity of auditory nerve fibers and/or auditory nerve synapses and/or IHC in a subject, the system comprising:

EEG-based hearing screening hardware, comprising electrodes and an amplifier;
sound stimulation generation and delivery devices; and,
a processing unit configured to perform the method as described herein, or embodiments thereof.

The EEG hardware, herein also referred to as EEG recording device, may comprise clinical or research EEG amplifiers and electrode caps (e.g. Neurospec, Biosemi, Interacoustics, brainscan, and intelligent hearing systems).

In some embodiments, the system comprises at least one reference electrode, one signal electrode, and one ground electrode.

In some embodiments, the system allows recording with sampling frequencies above 4 kHz and 4 electrodes (2 references, 2 signals) and offers a pre-amplification of the electrode signals with minimally 40 dB gain. i.e. the characteristics are preferably more stringent than for brain-computer-interface EEG, portable EEG, or cortical EEG.

Preferably, the system has a sampling frequency that is at least twice the highest modulation frequency of interest. In some embodiments, this corresponds to a sampling frequency that is at least 1000 Hz, preferably at least 2 kHz, preferably at least 4 kHz, preferably at least 8 kHz, preferably at least 12 kHz, for example about 16 kHz. This allows for a short duration stimulus which yields sufficient frequency resolution, for example to extract the spectral peaks in the analysis.

Preferably, the recorded EEG signal is amplified, with gain parameters which are more stringent than brain computer interfaces, given the small amplitudes of the signals of interest (order of 0.5 microV), and which are much smaller than cortical EEG signals. Amplification has the advantage that the need for more signal repetitions to obtain a sufficient signal to noise ratio in the averaged recording may be avoided.

EEG electrode configurations may comprise anything from regular multi-channel cap EEG, around-the-ear-electrodes (e.g. cEEGrid) or stick-on electrodes placed on Cz and/or Fp (e.g. dual channel IHS recording amplifier).

The reference and signal electrode(s) are preferably positioned in such a way that they best capture the dipole generated by the population of AN fibers and synapses in a particular ear. This dipole is typically oriented from the bottom to the top of the head, and hence a mastoid-Cz or mastoid-Fz or earlobe-Cz or earlobe-Fz placement have been found to be the best places to pick up this response. In some cases, you can also place the recording electrode on one mastoid and the reference electrode on the other ear mastoid.

The present invention also relates to a kit for performing the method as described herein, and embodiments thereof; the kit comprising:

a system as described herein, and embodiments thereof; and,
a computer program as described herein, and embodiments thereof, and/or a computer program configured to perform the method as described herein, and embodiments thereof.

The kit may comprise a computing device preconfigured with the computer program for performing the method as described herein, and embodiments thereof.

EXAMPLES

Example 1: Generating an Auditory Stimulation

Figure 2A:
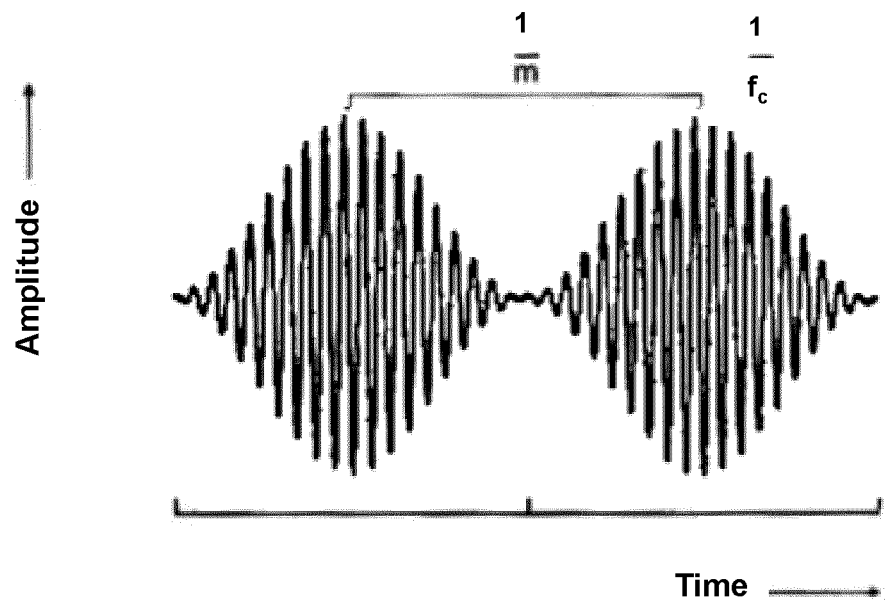
Figure 2B:
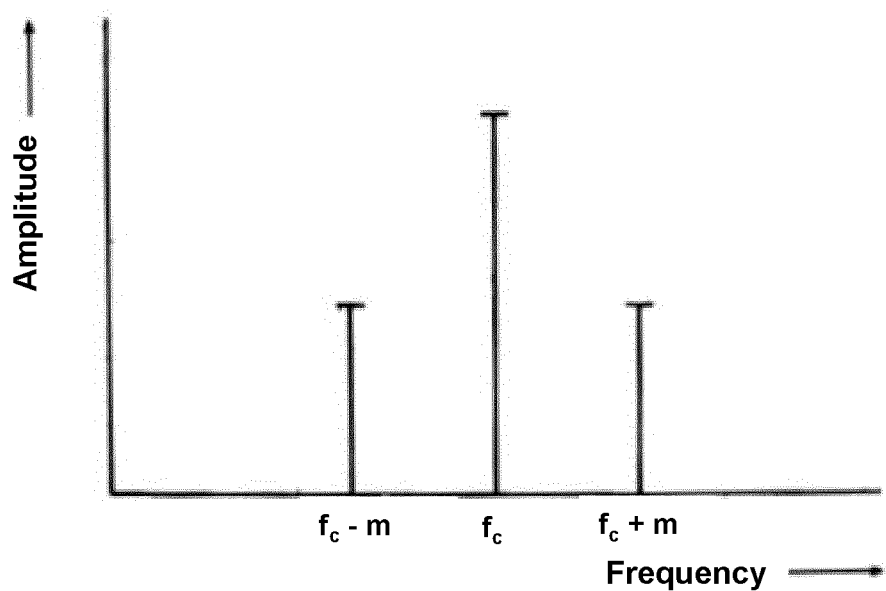
FIG. 2B illustrates the auditory stimulation in the frequency domain.

An auditory simulation not according to the invention is illustrated in FIG. 2. This figure illustrates an auditory stimulation s(t) created by modulating a pure-tone carrier signal c(t) with a sinusoidal modulator m(t). FIG. 2A illustrates the auditory stimulation s(t) in the time domain, while FIG. 2B illustrates the auditory stimulation in the frequency domain.

An exemplary method of generating an auditory stimulation according to a preferred embodiment of the present invention is detailed further in FIG. 3. In particular, FIG. 3A is an exemplary periodic modulator m(t) generated by the following squared function in MATLAB R2014b:

$$m(t) = \text{square}(2*\pi*f_m*t+\varphi_m, d),$$

using the following modulation parameters:
Modulation frequency ($f_m$) = 120 Hz
Modulation phase shift ($\varphi_m$) = $3\pi/2$
Duty-cycle (d) = 25%
Envelope slope variation and/or envelope distortion window ($\delta$ with $0 \leq \delta \leq \delta_{max}$, wherein $\delta_{max} = d/2$) (FIG. 3A)

The duty cycle d is the percentage of the ratio of pulse duration or width (W) to the total period (T) of the waveform, i.e. d=W/T*100%, as illustrated in FIG. 3A. The example stimulus in FIG. 3A has the optimal $\delta$=0, but envelope slope/shape deviations from the rectangular shape are allowed within the $\delta_{max}$ margin. Examples of possible slope/shape deviations are provided in FIG. 3B.

Figure 3C:
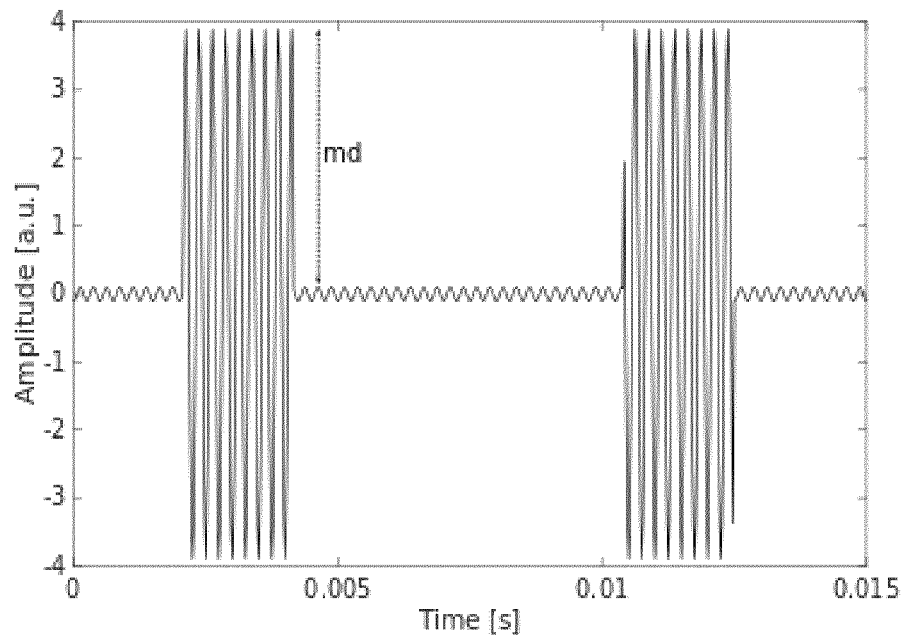

The above-described periodic modulator m(t) was used to modulate a carrier signal c(t) to produce an auditory stimulation s(t). FIG. 3C is an exemplary embodiment of an auditory stimulation s(t) generated by the following sin( ) function in MATLAB R2014b:

$$s(t) = c(t)*(1+md*m(t)) = \sin(2*\pi*f_c*t+\varphi_c)* (1+md*\text{square}(2*\pi*f_m*t+\varphi_m, d)),$$

using the following carrier parameters:
Carrier frequency ($f_c$) = 4000 Hz
Carrier phase shift ($\varphi_c$) = 0
Modulation depth (md) = 95%, also illustrated in FIG. 3C.

The generated auditory stimulation s(t) has a rectangular waveform with $\delta$=0 and a period of $2\pi$. It represents a stimulation s(t) generated by modulating a pure-tone carrier signal c(t) with the above-described modulator m(t).

Figure 3D:
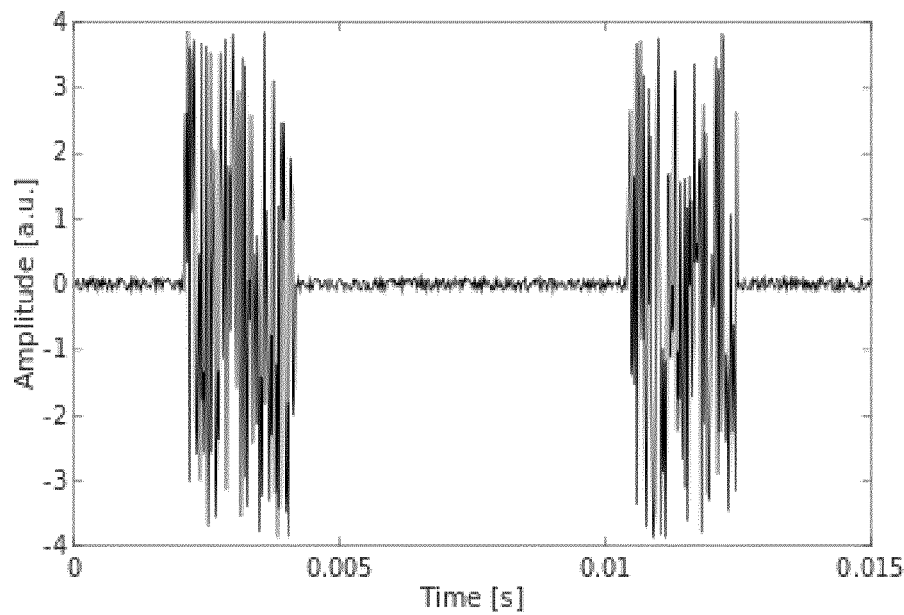

In practice, a pure-tone carrier signal can evoke a frequency specific response to identify tonotopic configuration of the sensorineural hearing loss profile. For a quick hearing screening test, broadband noise can be used as the carrier c(t) to yield a single response which stimulates all cochlear tonotopic frequencies at once. FIG. 3D is an exemplary embodiment of an auditory stimulation s(t) generated by the rand( ) function in MATLAB R2014b. It represents a stimulation s(t) generated by modulating a broadband noise carrier c(t) with the above-described modulator m(t).

Example 2: Neural Response to the Auditory Stimulation

Figures 6A, 6B:
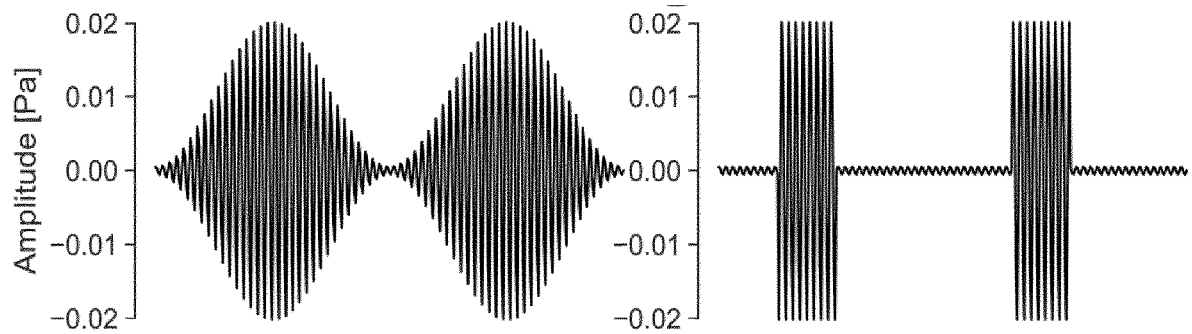
FIG. 6A shows an exemplary auditory stimulation (two cycles) not according to the invention, the stimulation comprising a carrier signal amplitude modulated by periodic modulator with a sinusoidal waveform.
FIG. 6B shows an exemplary auditory stimulation (two cycles) according to a preferred embodiment of the present invention, the stimulation comprising a carrier signal amplitude modulated by periodic modulator with a non-sinusoidal (rectangular) waveform.

The auditory response to an auditory stimulation generated according to the present method (i.e. a non-sinusoidal amplitude modulation as shown in FIG. 3C, FIG. 6B) was evaluated in comparison to an auditory stimulation not according to the invention (i.e. a sinusoidal amplitude modulation as shown in FIG. 2A, FIG. 6A). The two amplitude-modulated pure-tone stimuli were generated using the same carrier frequency (f=4 kHz) and rate ($f_m$=120 Hz, starting phase ($\varphi$) of $3\pi/2$). The only difference between the two stimuli was their modulator waveform shape: in particular, the stimulus $s_1(t)$ not according to the invention uses a sinusoidal amplitude modulator with the following equation:

$$s_1(t)=[1+md*\sin(2*\pi*f_m*t+\varphi_m)]*\sin 2*\pi*f_c*t),$$

while the second stimulus $s_2(t)$ was generated by a non-sinusoidal (rectangular) amplitude modulator as described in Example 1 above, with a duty cycle d of 25%. Modulation depth md of 0.95 (95%, −0.45 dB re. 100%) was used to avoid silence gaps in each modulation cycle. Both stimuli were windowed using a 2.5% tapered-cosine window, had a duration of 0.4 seconds and were repeated 1000 times each (500 per polarity).

More repetitions allow to improve the overall signal quality (signal quality improves with proportional to sqrt(No averages)). The longer the duration, the better the resolution of the spectral components in the frequency domain will be. The minimum duration of the signal is preferably at least 100 ms, to make sure the AN fibers reach their steady-state regime of firing. Before that time, onset effects may occur.

The inter stimulus interval (ISI) consisted of a uniformly distributed random silence jitter (mean ISI: 100 ms±10 ms). The stimulus not according to the invention was presented at 70 dB SPL and the present stimulus was presented at the same peak-to-peak amplitude, which corresponded to 68 dB SPL.

The ISI refers to the time between two epochs of the 0.4 duration stimuli, not to the time between cycles of the stimulus. The ISI is preferably jittered to avoid time locking of the EEG signal to e.g. heartbeat or line-noise of constant frequencies. The ISI preferably has a minimal duration of at least 60 ms, preferably at least 80 ms, for example about 100 ms, such that the AN fibers are "reset" after stimulation.

Testing Groups

Three participant groups were recruited using age (20≤age≤30 or 60≤age≤70) and audiometric pure-tone thresholds (≤ or >25 dB HL for frequencies up to 4 kHz) as the classification criteria. This grouping criterion did not consider individual degrees of synaptopathy, which is a variable that can be expressed in individual degrees within each participant group. 15 young normal-hearing (yNH: 24.5±2.3 y/o, 8 females), 16 older normal-hearing (oNH: 64.3±1.9 y/o, 8 females) and 13 older hearing-impaired (oHI: 65.2±1.8 y/o, 8 females) participants took part in the study. There were no significant age differences between the oNH and oHI participant groups (t(27)=−1.41, p=0.17). Otoscopy was performed prior to data collection to ensure that participants had no obstructions or other visible pathologies.

The suitability of the participants was verified using, e.g., pure-tone audiometric thresholds (PTs) collected using a clinical audiometer AT900 (Auritec) for frequencies between 0.125-8 kHz using Sennheiser HDA200 headphones. Normal-hearing participants had 4-kHz pure-tone thresholds of 3.3±3.6 (yNH) and 11.6±4.0 dB HL (oNH) respectively. The oHI group had high-frequency sloping audiograms with 4-kHz thresholds of 37.7±6.7 dB HL. Distortion product otoacoustic emissions (DPOAEs) were recorded at 4 kHz as a direct estimate of OHC integrity. Stimuli were presented over ER-2 speakers using foam ear tips, and recordings were made using the ER10B+ OAE microphone system (Etymotic Research) and custom-made MATLAB scripts (Mauermann, 2013). Two pure tones (f1, f2) were simultaneously presented at a fixed f2/f1 ratio of 1.2 using a primary frequency sweep method. L1 levels followed the Scissors paradigm given a primary L2 level of 30-60 dB SPL in steps of 6 dB (in oHI listeners, L2s of 66 and 72 dB SPL were additionally collected). DPOAE thresholds were determined as the median of the bootstrapped levels of L2 at which the extrapolated fitting curve reached a level of −25 dB SPL (1.12 mPa).

Individual Speech Intelligibility

The speech reception threshold (SRT) determines the speech-to-noise ratio (in dB) at which 50% of presented words in a 5-word sentence are perceived correctly using an adaptive tracking procedure. The German matrix test was used to determine the SRT in the presence of speech-shaped noise. The SRT for 50% correctly identified words was determined using a 1-up/1-down adaptive procedure with varying step size based on word scoring. The speech and noise signals were generated by applying a 1024th order FIR high-pass filter with cut-off frequencies of 1.65 kHz. The noise level was kept fixed at 70 dB SPL while the speech level was varied to determine the SRT.

EEG Response to Auditory Stimuli

Electroencephalography (EEG) recordings took place in a double-walled electrically shielded measurement booth (IAC acoustics) and participants sat in a reclining chair while watching a silent movie. EEGs were measured using a 64-channel cap with equidistant electrode spacing (Easycap) and active Biosemi Ag/AgCl electrodes were connected to a Biosemi amplifier. A sampling rate (fs) of 16384 Hz and 24-bit AD conversion were used to store the raw data traces.

Figure 4:
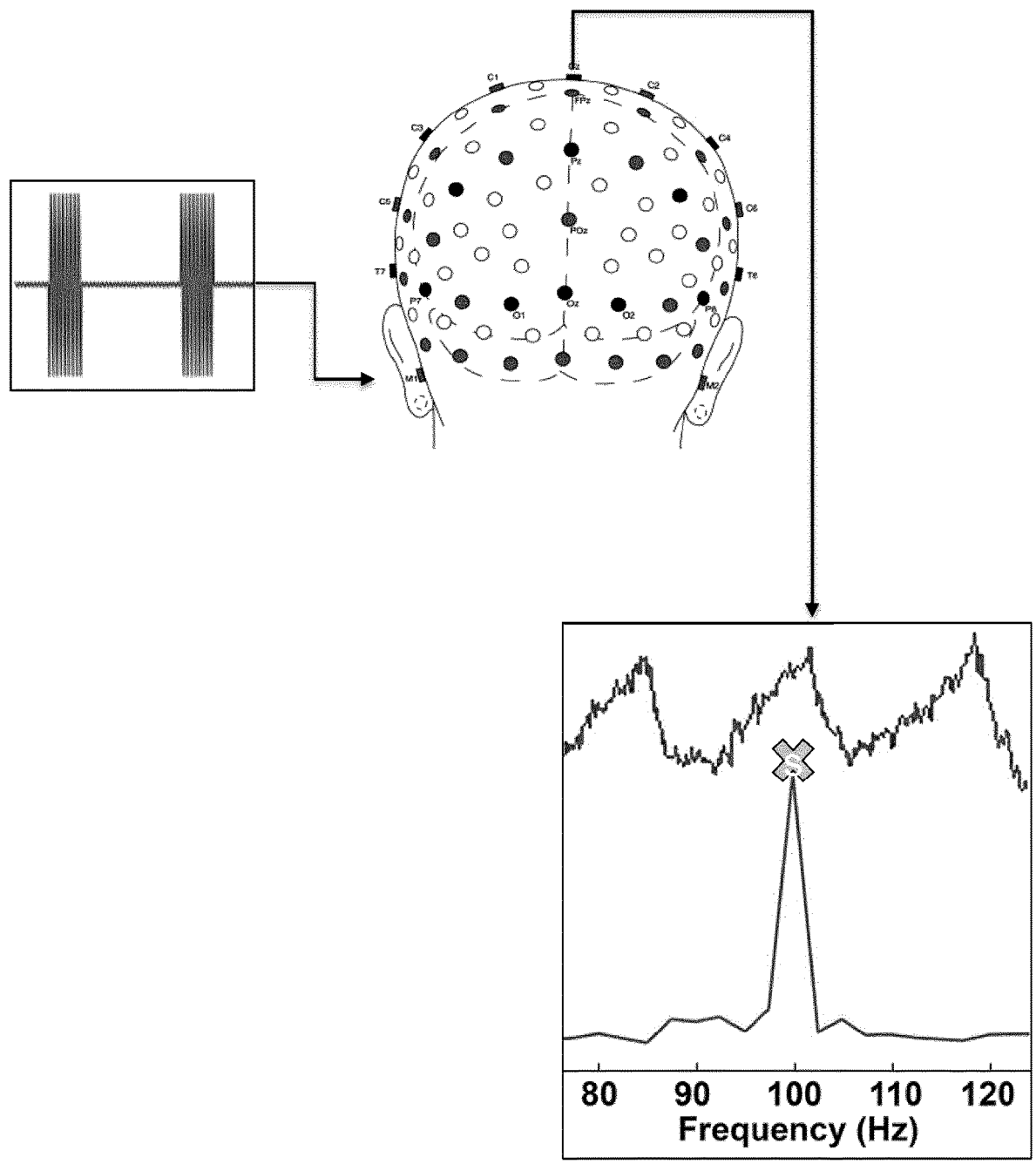
FIG. 4 illustrates an exemplary electroencephalography (EEG) set-up suitable for performing an aspect of the present invention. A subject is exposed to an auditory stimulation according to a preferred embodiment of the present invention. The recorded EEG subject data (in the time domain) responsive to the envelope following response (EFR) may be transformed using (discrete) Fourier Transform (dFT) to identify the frequency of the modulators (in the frequency domain) and optionally that of its harmonics.

A common-mode-sense (CMS) active electrode was placed on the fronto-central midline and a driven-right-leg (DRL) passive electrode was placed on the tip of the nose. Reference electrodes were placed on each earlobe. Electrode offsets (DC values of the common mode signal) were kept below 25 mV. Stimuli were generated in MATLAB (R2015b) at a sampling rate of 48 kHz and calibrated using the same equipment as for the speech recognition test (ear simulator type 4157 (Bruel & Kjær) for insert earphones). A Fireface UCX sound card (RME) connected to a TDT-H B7 headphone driver (Tucker-Davis) were used to transform the digital signal to drive the 330 ER-2 insert earphones (Etymotic Research) using the open-source portaudio playrec ASIO codec (Humphrey, 2008). Stimuli were presented monaurally based on the audio-metrically better ear. An exemplary EEG setup is shown in FIG. 4.

EEG Processing-Predicted Results

Raw EEG recordings were extracted in Python (version 2.7.10|Anaconda 2.3.0 (64-bit), (www.python.org) and MNE-Python (version 0.9.0; Gramfort 335 et al., 2013, 2014) and all channels were re-referenced to the offline-averaged earlobe electrodes. Data were epoched in 0.4 s windows starting from the stimulus onset and baseline corrected by the average amplitude per epoch.

Figure 5A:
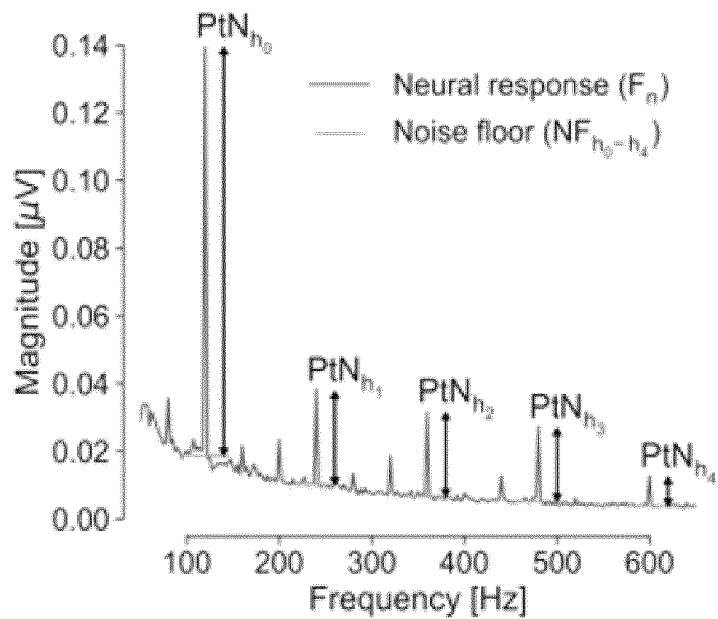
FIG. 5A shows the extraction of the magnitudes (PtN, vertical arrows) for the modulation frequency and its first four harmonics in the frequency domain.
Figure 5B:
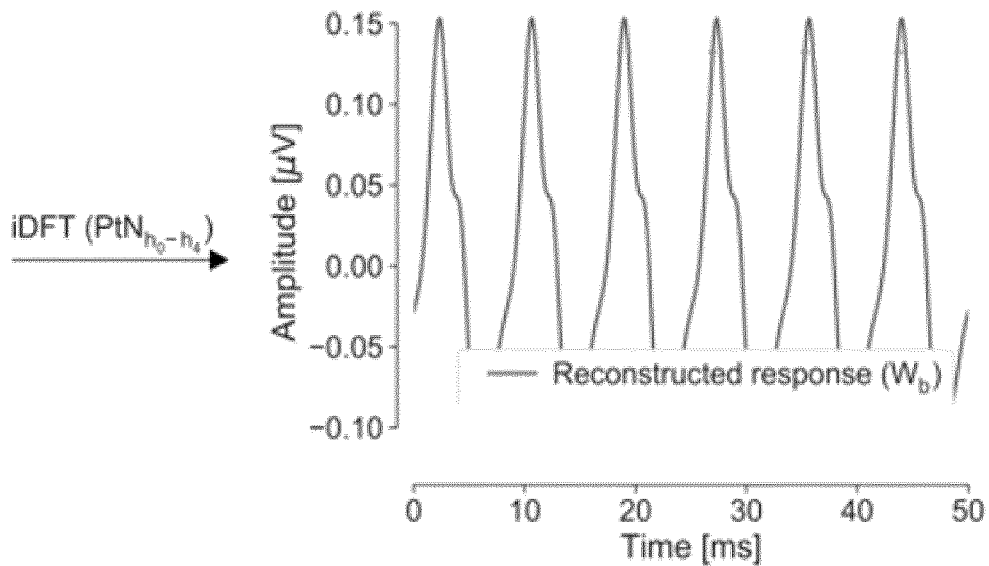
FIG. 5B shows the reconstructed time-domain wave form based on the five frequency components (h0-h4) and their respective phases.

Pre-processing was performed in MATLAB (R2014b). The estimates for each stimulus condition and participant were computed based on the energy at the modulation frequency and its first four harmonics (h0-h4=k×$f_m$, k=[1 . . . 5]) to account for all envelope related energy in the EEG signal. The process is visualized in FIG. 5, which is a schematic of the computation process per bootstrap run, based on the averaged yNH EEG response of a single participant to the present rectangular modulated stimulus.

A) Extraction of the magnitudes (PtN, vertical arrows) for the modulation frequency and its first four harmonics (h0-h4) from the averaged spectral estimate of the neural frequency responses (Fn). The horizontal lines at the base of the frequency peaks indicate the respective noise floor levels (NFs) for each considered frequency.

B) Reconstructed time-domain wave form based on the five frequency components (h0-h4) and their respective phases. The magnitude is extracted from the averaged, bootstrapped, and reconstructed time-domain waveforms (i.e. the peak-to-peak amplitude divided by 2).

Model-Predicted Results

Figures 6C, 6D:
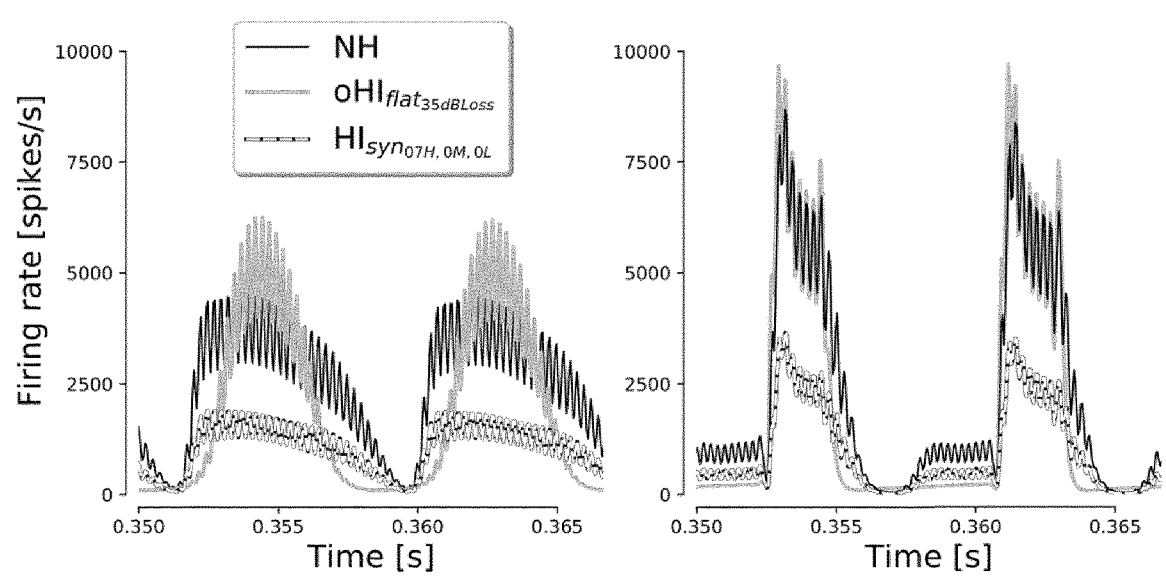
FIG. 6C and FIG. 6D depict simulated summed ANF firing rates from the ANFs which synapse onto a single inner hair cell with a 4-kHz characteristic frequency, i.e., the cochlear location corresponding to the carrier frequency of the stimulus. Shown are the response to a stimulus not according to the invention (FIG. 6C) and to a stimulus according to the invention (FIG. 6D) for three auditory profiles: no hearing deficits (NH), hearing-impaired with simulated synaptopathy ($HI_{SYN}$) and hearing-impaired with 35 dB hearing loss across all frequencies ($HI_{FLAT}$).

FIG. 6C and FIG. 6D depict simulated summed ANF firing rates from the ANFs which synapse onto a single IHC with a 4-kHz CF, i.e., the carrier frequency of the stimulus not according to the invention (FIG. 6C) and the stimulus according to the invention (FIG. 6D). Simulations were conducted using a computational model of the human auditory periphery (Verhulst et al., Hearing Research, 2018). Responses to two cycles of the stimuli described above are shown for three SNHL profiles:

(i) a NH response summed over 19 ANFs (NH);
(ii) a synaptopathy response (HIsyn) in which the number of ANFs was reduced to seven high-SR fibers; and,
(iii) an OHC damage response (HIflat) which had 19 ANFs and a hearing sensitivity loss of 35 dB across all frequencies.

In general, the present stimulus elicited a larger and more synchronized ANF response with sharper on- and off-sets compared to the stimulus not according to the invention. The ANF firing rate reduced for both stimulus types when a lower number of ANFs were available (HIsyn). Introducing OHC damage (HIflat), affected the responses to the stimulus not according to the invention and the stimulus according to the invention differently: while the ANF rate to the tone not according to the invention was increased and started showing a bell-shaped pattern, the response to the present stimulus was barely affected. This outcome shows that on-CF ANF responses to the present stimulus are sensitive to the synaptopathy aspect of sensorineural hearing loss while being insensitive to the OHC damage aspect.

The single-unit ANF simulations predict that the present stimulus:

(i) yields overall larger response amplitudes which could enhance the sensitivity of the method to characterize individual differences; and,
(ii) evokes a response which is primarily sensitive to synaptopathy, even when co-occurring OHC damage is present.

Figure 6E:
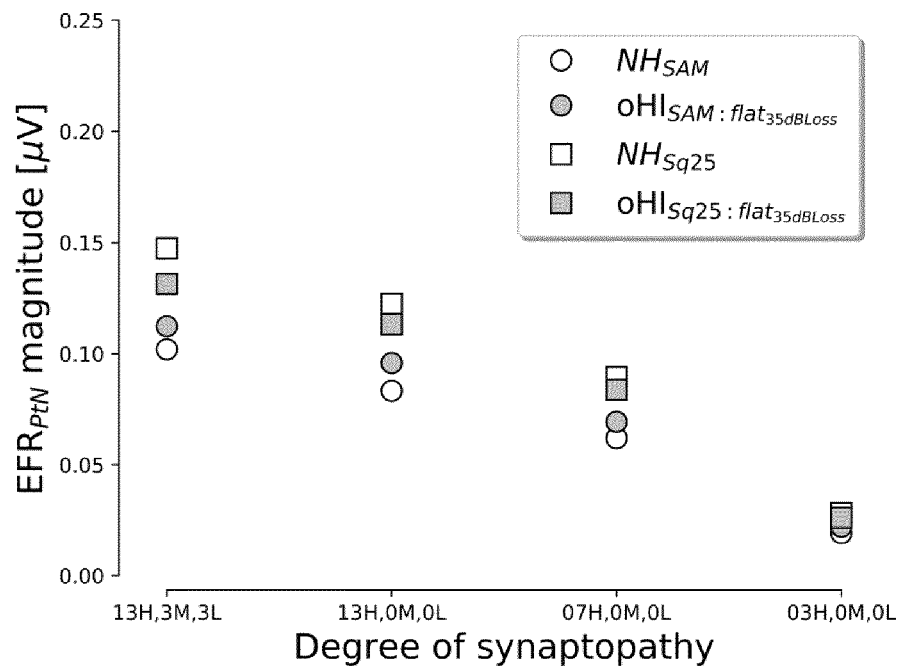
FIG. 6E demonstrates that simulated source generators of auditory EEG responses (i.e., a proxy to the responses measured in humans using EEG electrodes) to the stimulus according to the invention (squares) were larger than the responses to a stimulus not according to the invention (circles) and showed a greater sensitivity to the same degree of simulated synaptopathy.

FIG. 6E shows that the simulated responses to the stimulus according to the invention (squares) were greater than the responses to a sinusoidal amplitude-modulated (SAM) stimulus not according to the invention (circles). Along with the overall increased amplitudes, the present stimulus also yielded a greater sensitivity range. The predicted influence of OHC damage (HIflat) was small compared to the effect of synaptopathy and became even smaller as the degree of synaptopathy increased.

Experimental Results

Figure 6F:
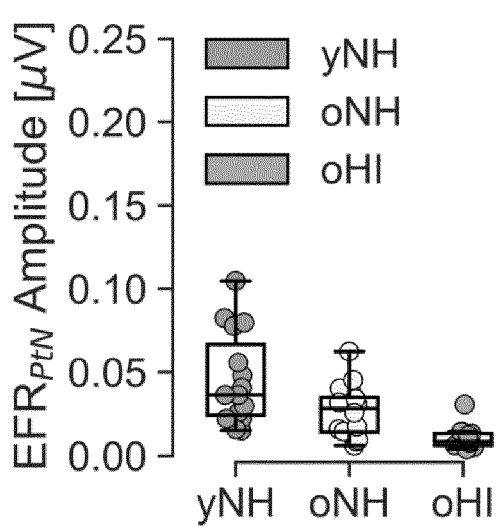
FIG. 6F shows boxplots and individual data points of the measured response amplitudes derived from human EEG recordings for auditory stimulation using a sinusoidal amplitude modulated waveform (FIG. 2A, FIG. 6A), i.e. not according to the invention, for three auditory profiles: young normal-hearing (yNH), old with normal audiometric thresholds (oNH), and old hearing-impaired (oHI).
Figure 6G:
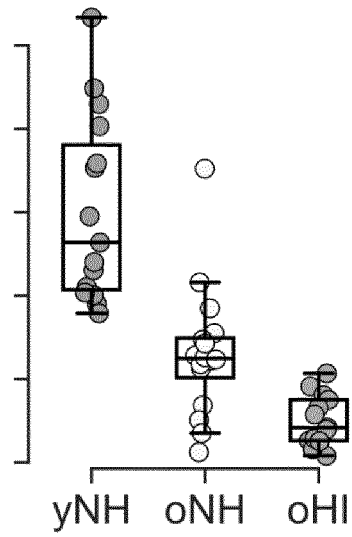
FIG. 6G shows boxplots and individual data points of measured response amplitudes derived from human EEG recordings for auditory stimulation using a (non-sinusoidal) rectangular amplitude modulated waveform, according to the invention (FIG. 3B, FIG. 6B) for three auditory profiles: young normal-hearing (yNH), old with normal audiometric thresholds (oNH), and old hearing-impaired (oHI).

The experimental EEG-recorded amplitudes depicted in FIG. 6F are in agreement with the model predictions and confirm the larger overall present response amplitudes. Secondly, the predicted sensitivity to different aspects of SNHL might be reflected in the different behavior of the oNH group across stimulus conditions. Whereas the oNH responses results largely overlapped with those of the yNH group for the SAM stimulus, there was a clear separation between the response amplitudes of the yNH and oNH groups to the present stimulus (i.e. showing higher sensitivity to synaptopathy).

Figure 7A:
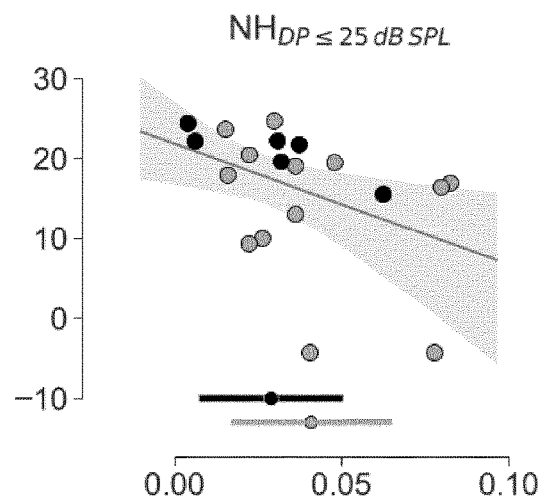
FIG. 7A, which shows the response for the NH participants subgroup stimulated using a sinusoidal amplitude modulated waveform.
Figure 7B:
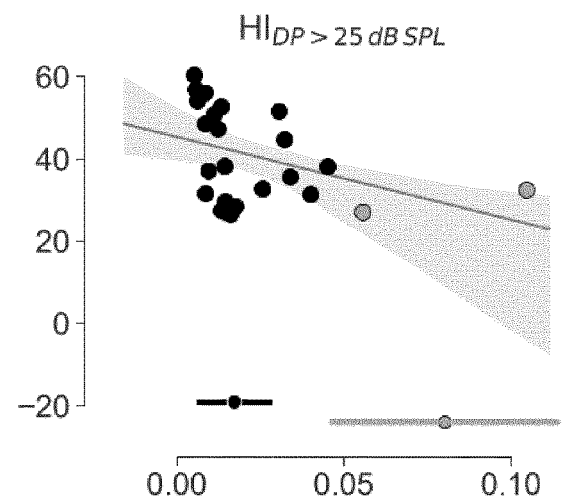
FIG. 7B, which shows the response for the HI participants subgroup stimulated using a sinusoidal amplitude modulated waveform.
Figure 7C:
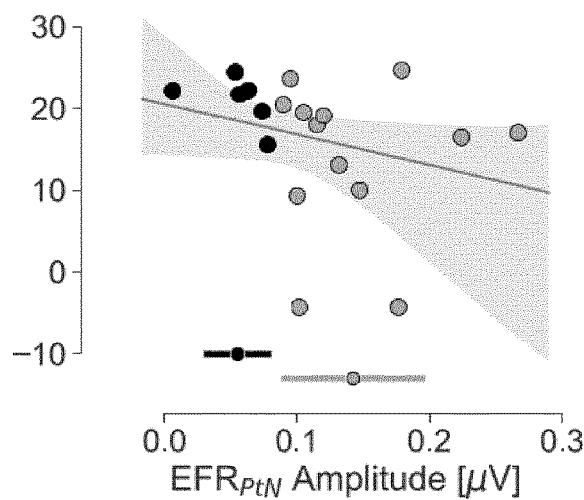
FIG. 7C, which shows the response for the NH participants subgroup stimulated using a rectangular (non-sinusoidal) amplitude modulated waveform.
Figure 7D:
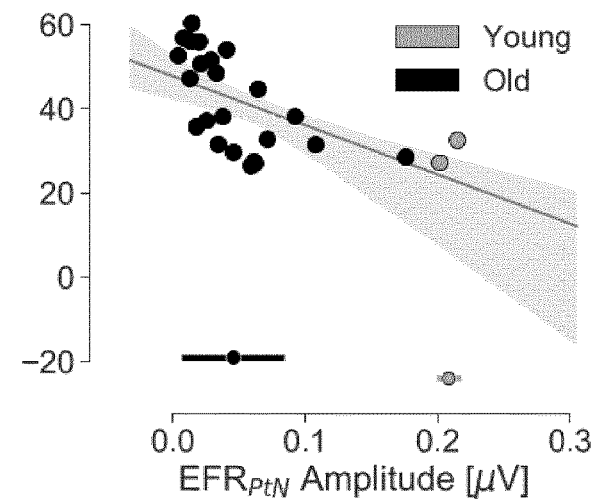
FIG. 7D, which shows the response for the HI participants subgroup stimulated using a rectangular (non-sinusoidal) amplitude modulated waveform.

Additionally, FIG. 7 shows that within groups of similar objective hearing thresholds (Distortion-Product OAE thresholds > or <25 dB SPL), the rectangular envelope stimulus (FIG. 7C and FIG. 7D) was better able to separate younger and older listeners on the basis of the EEG response magnitude ($EFR_{PtN}$) than for the SAM stimulus (FIG. 7A and FIG. 76). This finding is in agreement with how age-related synaptopathy is expected to affect the EEG response. Age-related synaptopathy could be detected on the basis of the EEG response to the rectangular stimulus, but not on the basis of the DP threshold in the <25 dB SPL group (C). At the same time, for listeners with DP thresholds >25 dB SPL ($HI_{DP}$), the EEG response to the rectangular stimulus (D) placed both older subjects of the same age in the same range (i.e. similar degrees of cochlear synaptopathy), whereas they were separated from each other when using the SAM stimulus (B). The latter observation is consistent with that the SAM EEG response is affected by both OHC damage and synaptopathy, whereas the present rectangular stimulus was primarily sensitive to the age-related synaptopathy aspect of sensorineural hearing loss. Along with the model predictions in FIG. 6C and FIG. 6D, these experimental findings support that the EEG response to the present rectangular stimulus is primarily sensitive to the synaptopathy aspect of sensorineural hearing damage.

The combined simulation and experimental approach was able to evaluate to which degree the present considered EEG markers of synaptopathy are sensitive to either threshold or supra-threshold TENV deficits, presumably caused by OHC and ANF/ANS damage, respectively.

Figure 8A:
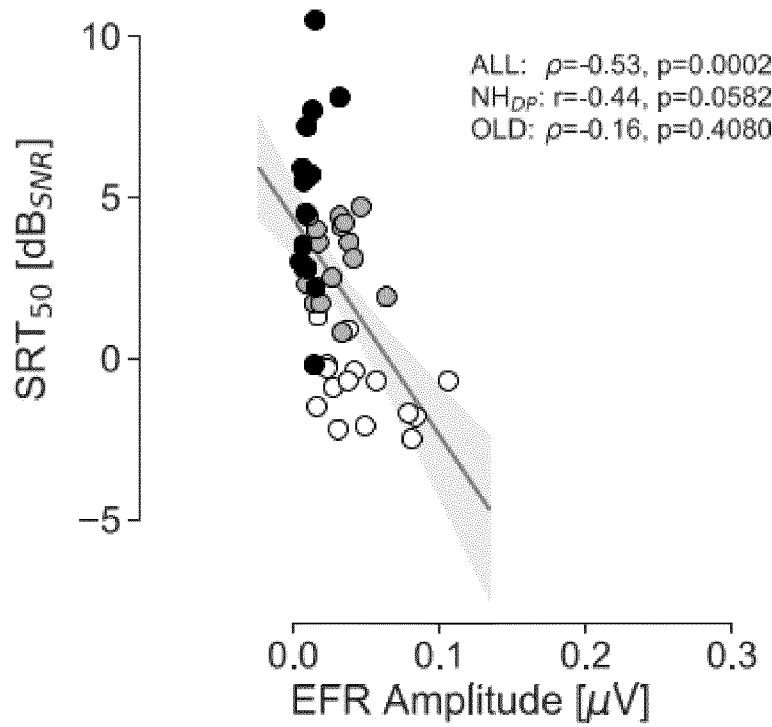
FIG. 8 presents the regression plot between EEG response amplitudes (EFR amplitude) and speech intelligibility in noise scores (SRT) for three subgroups of listeners, namely young normal-hearing (yNH), old with normal audiometric thresholds (oNH), and old hearing-impaired (oHI). The EEG responses were recorded with auditory stimulation using a sinusoidal amplitude modulated waveform (FIG. 2A, FIG. 6A, FIG. 8A) as compared to a rectangular (non-sinusoidal) amplitude modulated waveform (FIG. 3B, FIG. 6B, FIG. 8B) according to a preferred embodiment of the present invention.
FIG. 8C and FIG. 8D compare the relation between speech intelligibility and the EEG magnitude extracted using an analysis method according to a preferred embodiment of the present invention, i.e., extracting the frequency corresponding to the stimulus envelope and its harmonics ($f_0$-$f_N$, FIG. 8D), to an EEG analysis method which only considers $f_0$ (FIG. 8C). Note that the speech material was not high-pass filtered in FIG. 8C and FIG. 8D.
Figure 8B:
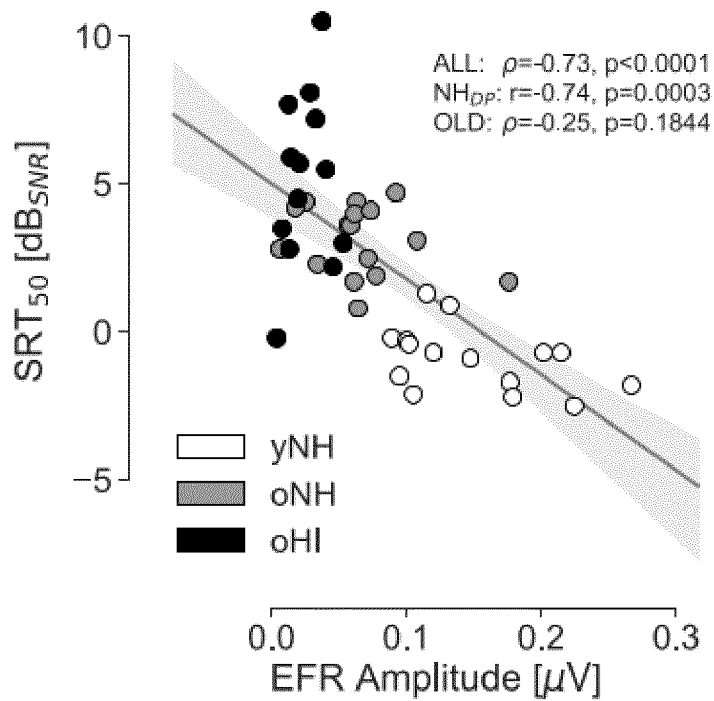

FIG. 8A and FIG. 8B demonstrate that the EEG response to the stimulus with a rectangular envelope (FIG. 8B, FIG. 3C) is better able to predict individual speech intelligibility performance in noise, compared to stimulations with a sinusoidally shaped envelope for the EEG recordings (FIG. 8A, FIG. 2A). These data show that the present method for determining ANF/ANS integrity provides improved sensitivity to predict individual speech intelligibility performance in background noise.

Figure 8C:
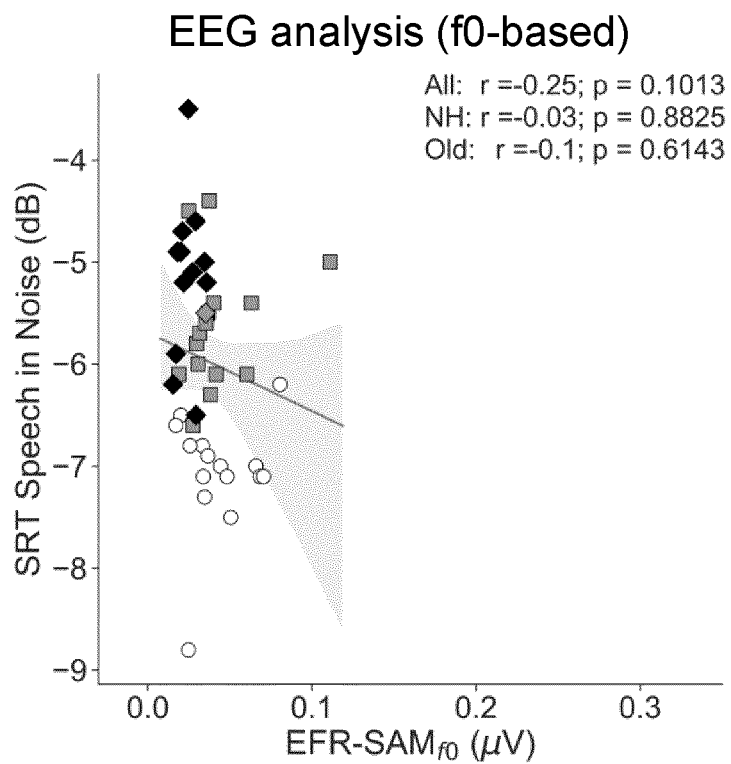
Figure 8D:
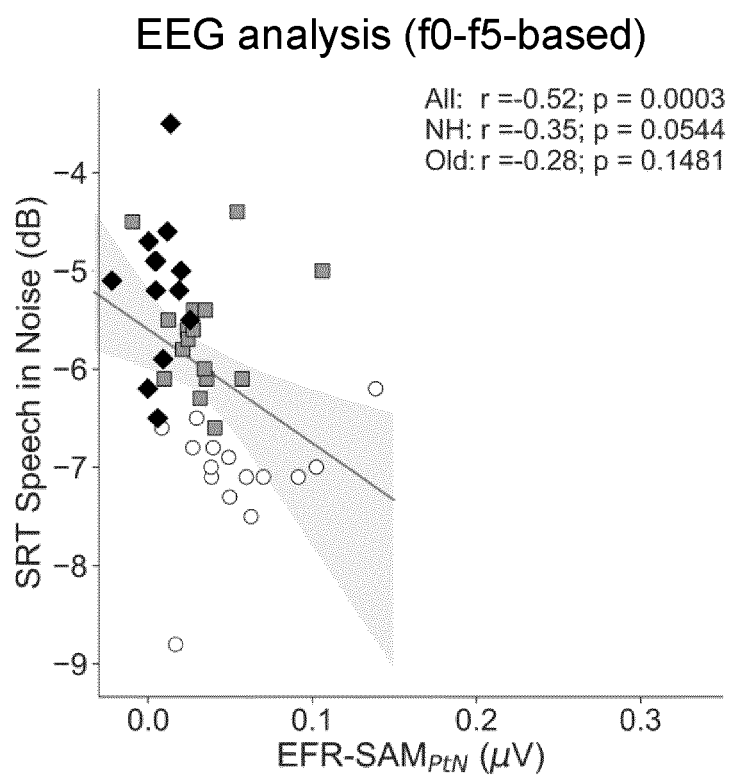

Further, FIG. 8C and FIG. 8D demonstrate that a preferred method to derive the magnitude from the EEG recording (marker of ANF/ANS integrity) which includes the stimulus envelope and all available harmonics of the FD representation of the EEG recording (f0-f5) to extract the magnitude, yields a better prediction of individual speech intelligibility (FIG. 8D) compared to a method applied to the same EEG recordings (FIG. 8C) that only considers f0 to calculate the magnitude. The preferred method yields overall larger magnitudes (EFR), which makes the preferred method more robust against background noise. The preferred method is furthermore able to predict individual speech intelligibility more robustly (and significantly) than when using f0-based EEG analysis method.

Figure 9:
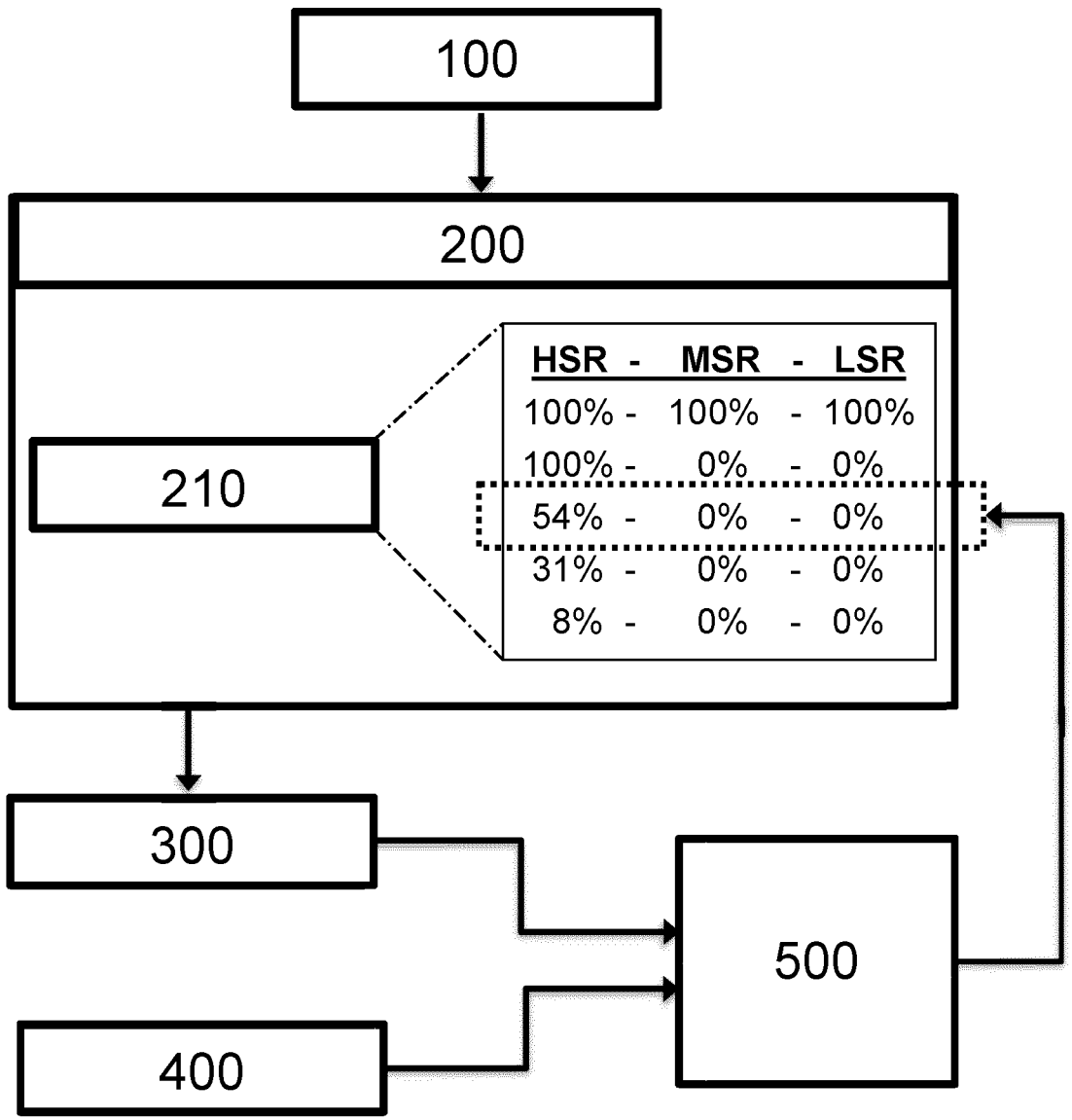
FIG. 9 presents a flow-chart of the preferred steps for determining an AN fiber and synapse profile, and optionally using reference data to determine a subject specific auditory profile.

Example 3: Method for Determining the Integrity of AN Fibers and Synapses of a Subject The model for determining the integrity of auditory nerve fibers and synapses of a subject according to a preferred embodiment of the present invention is discussed with reference to FIG. 9, which presents a flow-chart of the preferred steps for determining an ANF/ANS integrity profile and optionally using reference data to determine a subject specific auditory profile. The recording is compared to that of a normative dataset of "normal" people with normal ANF/ANS. By comparing the reference to the subject, a subject-specific auditory profile can be obtained.

(100) is an auditory stimulus (e.g. a sound) that evokes an auditory response across a population of AN fibers and synapses along the cochlea. The stimulus can be used for the EEG recording to diagnose ANF/ANS damage. The stimulus characteristics can be designed to target a limited or broad frequency range of hearing. In a preferred embodiment, the auditory stimulus may be a carrier signal c(t) (e.g. broadband noise or pure tone) which is amplitude modulated by a periodic modulator with a non-sinusoidal (rectangular) waveform m(t).

(200) is a biophysical model of the signal processing of the auditory periphery, (which preferably includes a numerical description of cochlear mechanics, outer- and inner-hair cells functionality as well as represents the firing rates of AN synapses and firing). The model may include data from, e.g., simulated and/or experimental frequency and/or type specific ANF damage profiles (210). The ANF/ANS (210) damage profiles could be determined based on experimental data (e.g. EEG recording). The ANF/ANS data may be subdivided based on a subset of the ANF population; this may include high spontaneous rate fibers (HSR), medium spontaneous rate fibers (HSR), and low spontaneous rate fibers (LSR), and/or these fiber subtypes in selected hearing frequency ranges.

(300) responses for the whole or a subset of the ANF/ANS population may be simulated to obtain a predicted auditory response to the auditory stimulus. This auditory response can be a simulated auditory EEG response, simulated auditory sound perception and/or simulated cochlear, ANF and brainstem processing). Calculation of the response magnitudes (from the simulations) of EEG responses to the present or different stimuli may allow to create various auditory responses corresponding to the different ANF/ANS profiles or other input parameters. The auditory responses may be further subdivided using category-based parameters, based on e.g. age, sex, etc., or other parameters. The calculated auditory responses and corresponding ANF/ANS damage profiles may be stored on or made available through a database.

(400) The subject's EEG response to the present auditory stimulus (100) may be experimentally measured using an EEG set-up. Processing of the EEG data allows for calculating the subject specific EEG response amplitudes to said stimulus.

(500) the processed subject's EEG response data may be interpreted using the predictive simulation data (300) to assign the subject to an auditory profile. The assigning can be performed automatically by means of a matching algorithm (500). The assigned profile is preferably based on the best possible match between the simulated and recorded EEG response amplitudes. Based on the assigned auditory profile, the integrity of the subject's AN fibers and synapses may be determined. For example, in the present figure the subject is assigned an ANF/ANS profile characterized by a 54% HSR, 0% MSR and 0% LSR damage profile. Because the best matching ANF/ANS profile did not return 100% ANF types in all ANF categories, this subject has a degree of cochlear synaptopathy.

Example 4: Method for Determining the Outer-Hair Cell (OHC) Damage of a Subject

Figure 10:
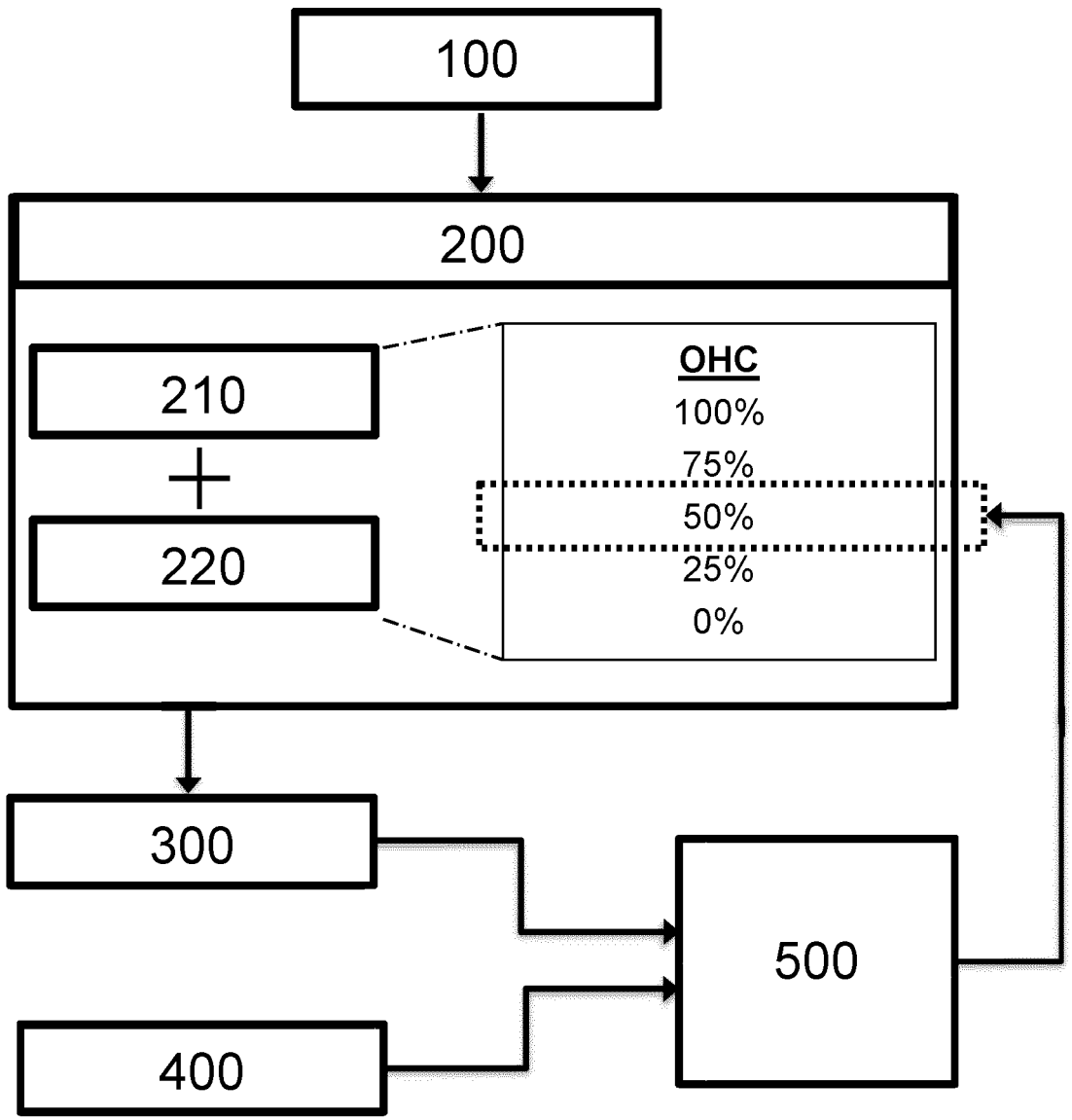
FIG. 10 presents a flow-chart of the preferred steps for determining an ANS/ANF and OHC profile, and optionally using reference data to determine a subject specific auditory profile.

Further to above-described Example 3, the method for determining the AN fiber and synapse integrity of a subject may be expanded to also determine the outer-hair cell (OHC) damage of said subject. The method is described with reference to FIG. 10, which presents a flow-chart of the preferred steps for determining an individual ANF/ANS and OHC damage profile and optionally using subject data to determine a subject-specific auditory profile.

In particular, the biophysical model of the auditory periphery (200) may be expanded to also include, e.g., simulated and/or experimental frequency specific OHC damage profiles (220). The OHC damage profiles (220) could be determined based on experimental data of frequency-specific hearing loss (e.g. from audiogram test, otoacoustic emissions). Alternatively, the OHC damage profiles (220) could be kept variable such that the matching algorithm (500), which finds the best subject match, can be optimized both for AN and OHC profiles simultaneously. For example, in the present figure the subject is assigned an OHC profile characterized by 50% OHC damage, based on the subject's experimental EEG recordings and the best match with a specific simulated auditory response to the same stimulus within a database of simulated auditory responses to a number of auditory profiles (including ANF/ANS and OHC damage). The subject in the illustration was determined to have a degree of OHC related hearing loss.

Figure 11:
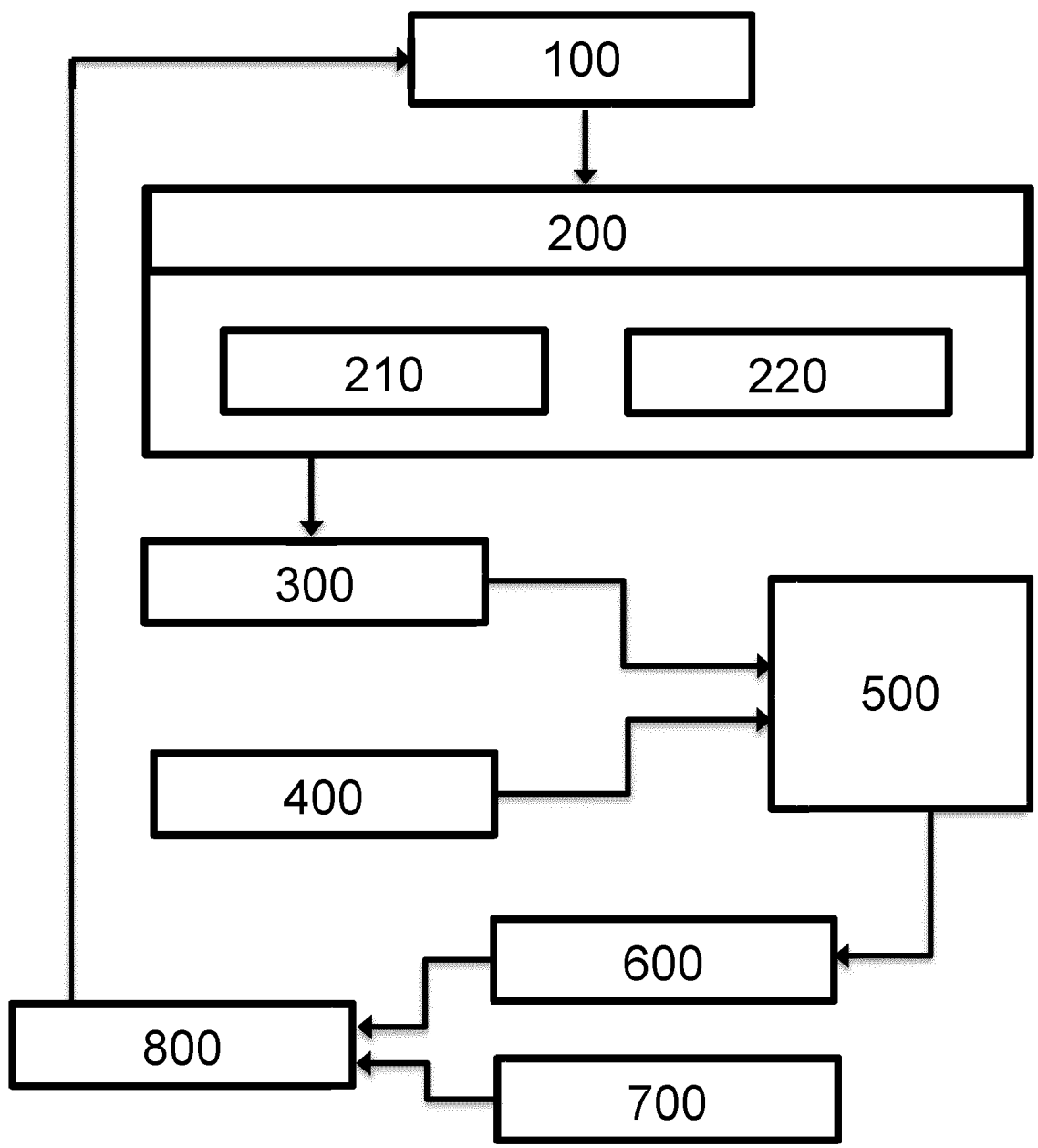
FIG. 11 presents a flow-chart of the preferred steps for determining a desired auditory response. The determined auditory response may be used for configuring auditory devices, such as cochlear implants or hearing aids.

Example 5: Method for Modifying the Desired Auditory Responses to Sound for a Subject Further to above-described Example 4 or Example 5, the method(s) for determining the integrity of ANFs/ANSs and/or OHC damage of a subject may be used to modify the desired auditory responses to sound for said subject. The method is described with reference to FIG. 11, which presents a flow-chart of the preferred steps for determining a signal processing algorithm (600) which is used to modify the auditory stimulus which yields the desired auditory response. The determined signal processing algorithm may be used for configuring auditory devices, such as cochlear implants or hearing aids.

Captured (personalized) auditory responses to sound (e.g. auditory EEG responses, sound perception, cochlear, ANF and brainstem processing, 400) can be used to determine the subject specific ANF and OHC damage auditory profile (500). This auditory profile can be included in an auditory periphery model to simulate auditory responses to any acoustic stimulus (600). The individually simulated auditory response can be compared to a desired auditory response (700). The desired response may be experimental or simulated and could for example be the response from a normal-hearing subject or be a response with enhanced features. A signal-processing algorithm (800) is afterwards included to adjust the sound stimulus in such a way that the simulated auditory response (600) matches the desired auditory response (700). For example, this matching algorithm (800) may end up filtering, onset sharpening, compressing and/or expanding the audio stimulus (100).

Example 6: Neural Response to an Auditory Stimulation

Further to above-described Example 1, to show how the stimulus envelope shape affects the EFR sensitivity to different SNHL aspects, an additional number of simulations is provided wherein the duty cycle (FIG. 12) and the modulation rate (FIG. 13) are modified.

Figure 12A:
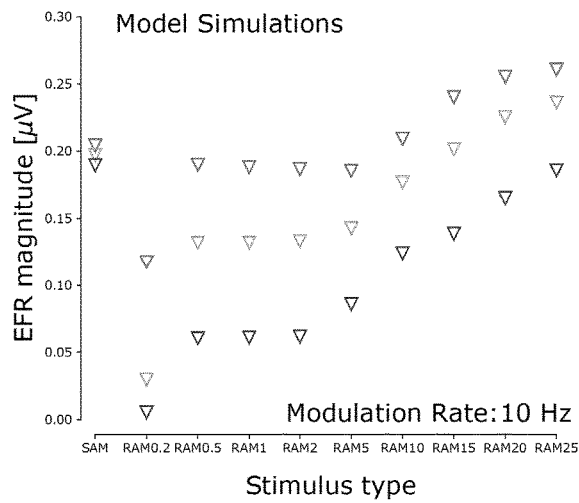
FIG. 12A presents model simulations for 10 Hz modulation frequency.

With reference to FIG. 12A it is shown that the rectangular stimulus (RAM) with a 25% duty cycle (RAM25) at 10 Hz modulation frequency yields improved response magnitudes compared to lower % RAM stimulations. It can be understood that neural response to very short duty cycles ("click-like") yields lower amplitudes (comparing leftmost to rightmost RAM) and is more sensitivity to OHC damage (comparing lowermost to uppermost triangles). As such, lower duty cycles are less preferred for differential diagnosis of synaptopathy.

Figure 12B:
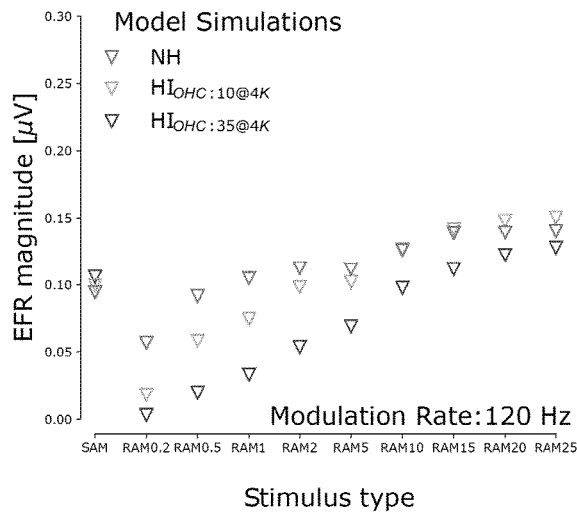
FIG. 12B presents model simulations for 120 Hz modulation frequency.

With further reference to FIG. 12B, it is shown that the insensitivity of the response magnitudes to OHC damage is even more pronounced at a higher 120 Hz modulation frequency. Focusing on the RAM25 condition (RAM25—120 Hz modulation rate), only a minimal influence of OHC damage can be seen on the response magnitude. Accordingly, out of the presented conditions, the RAM25 provides a preferred embodiment to differentially diagnose synaptopathy. Accordingly, out of the presented conditions, the RAM25 at 120 Hz modulation rate provides an even more preferred embodiment to differentially diagnose synaptopathy.

Figure 13:
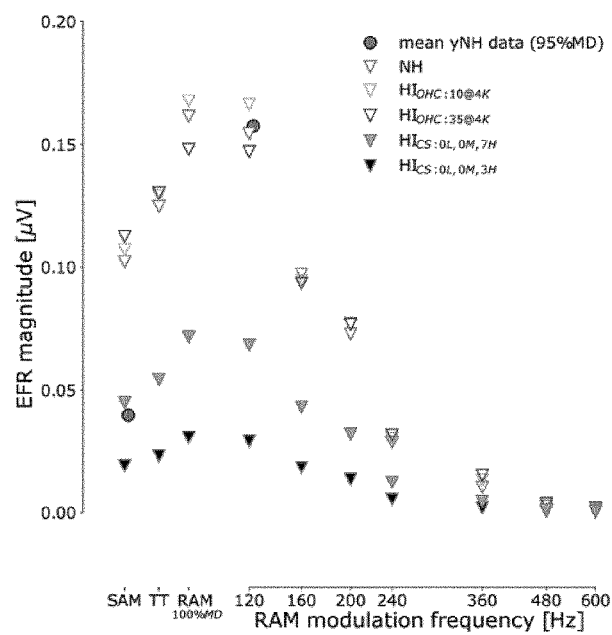
FIG. 13 presents model simulations of the neural response to rectangular amplitude modulated (RAM) waveforms in function of the modulation frequency (Hz) for normal-hearing (NH), hearing-impaired with outer hair cell damage ($HI_{OHC}$) and hearing-impaired with ANS/ANF damage ($HI_{CS}$). 120-Hz modulation rates yield the highest response magnitudes, and RAM stimulation is more sensitive to detect CS-related deficits than SAM or TT stimuli.

With reference to FIG. 13, it is shown that the rectangular stimulus (RAM) with a 25% duty cycle (RAM25) and 120 Hz modulation frequency (RAM100% MD or 120 Hz datapoints) yields higher responses (follow NH triangles) than sinusoidal (SAM) modulator or transposed tones (TT; or exponential modulation). Because the responses are higher, there is an increased sensitivity of the response to the same degree of applied synaptopathy/deafferentation (Compare % reduction from NH triangles to filled CS triangles).

In summary, the % EFR reduction (i.e., normalized to the NH EFR) was −10, −4 and +4% for the 35 dB HL OHC-damage pattern (NH vs OHC triangles), whereas it was 81% for the most severe, 0L,0M,3H synaptopathy pattern (NH to filled CS triangles). In absolute EFR values, the RAM EFR was reduced by 0.08, 0.10 and 0.12 µV resp. for the same degree of synaptopathy, demonstrating the superior sensitivity of the RAM EFR metric for diagnostic purposes, compared to SAM or TT stimuli of the same level and modulation rate.

Figure 14:
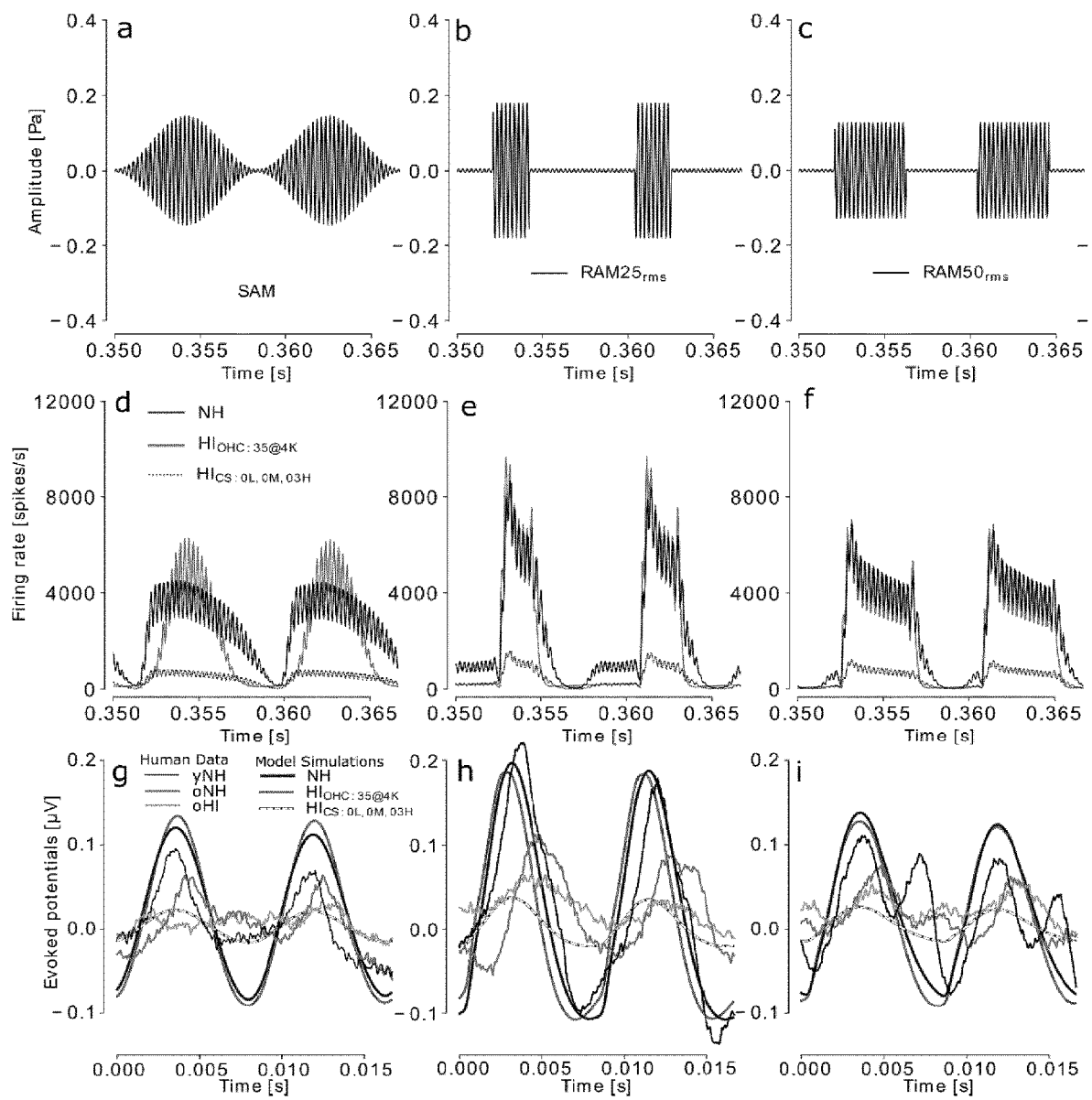
FIG. 14 presents model simulations of the neural response to three auditory stimuli:
- The upper panels show the waveforms: a sinusoidal amplitude modulated waveform (SAM—FIG. 14 (a)), a rectangular amplitude modulated waveform with a 25% duty cycle (RAM25—FIG. 14 (b)) and a rectangular amplitude modulated waveform with a 50% duty cycle (RAM50—FIG. 14 (c)).
- The middle panels show the corresponding single-unit firing rates summed across all ANFs connected to a single IHC (spikes/s) for SAM (FIG. 13 (d)), RAM25 (FIG. 14 (e)) and RAM50 (FIG. 14 (f)).
- The lower panels show the corresponding simulated evoked potential generators and recorded human evoked potentials (μV) for SAM (FIG. 13 (i)), RAM25 (FIG. 14 (j)) and RAM50 (FIG. 14 (k)).
Figure 15:
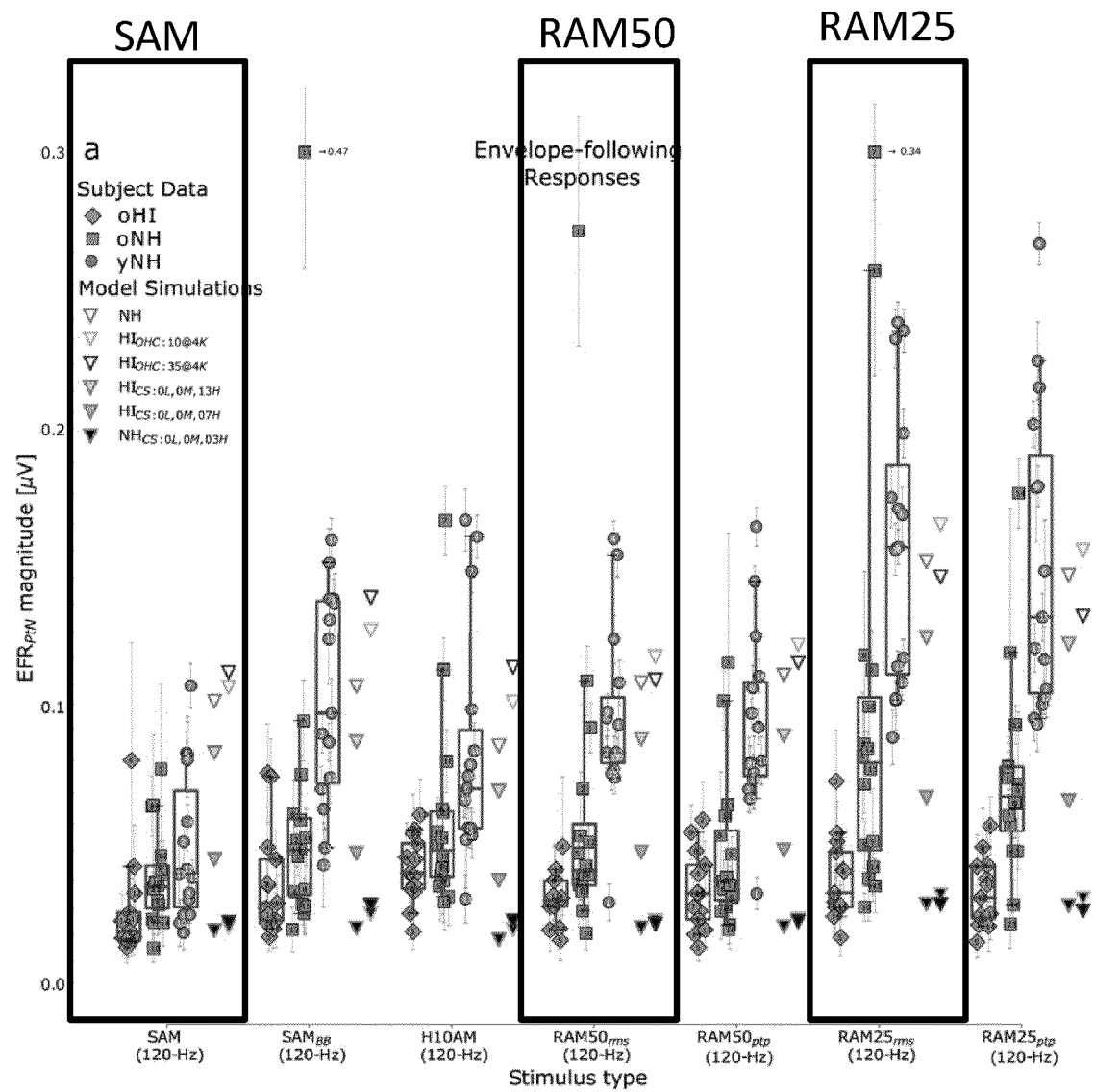
FIG. 15 presents the neural response as auditory-evoked potentials (AEP) for three subgroups of listeners, namely young normal-hearing (yNH), old with normal audiometric thresholds (oNH), and old hearing-impaired (oHI), along with model simulations (triangles) for different sensorineural hearing loss profiles and stimulus types, namely sinusoidal amplitude modulated waveform (SAM), rectangular amplitude modulated waveform with a 50% duty cycle (RAM50) and rectangular amplitude modulated waveform with a 25% duty cycle (RAM25). Comparative experimental data and model simulations show that RAM25 (25% duty cycle) yields improved response in terms of EFR/ASSR response magnitudes than RAM50 (50% duty cycle) and SAM.

Further shown in FIG. 14, the RAM25 condition (rectangular stimulus with a 25% duty cycle—120 Hz modulation) evokes better single unit auditory-nerve responses (middle panels—NH) and ASSR/EFR waveforms (bottom panels—NH) than both SAM (sinusoidal stimulus) and RAM50 modulation (rectangular stimulus with a 50% duty cycle, longer plateau duration). At the same time, comparative experimental data and model simulations show that the RAM25 duty cycle gives better EFR/ASSR strength than RAM50 and SAM (FIG. 14, bottom panels). At the same time, the RAM50 EFR waveform (FIG. 14i) shows an undesired double-peak response (yNH data) as compared to the single peak response observed for the RAM25 condition (FIG. 14g). The double-peak response in the RAM50 yields overall smaller EFR amplitudes that are less sensitive to detect synaptopathy than the RAM25 response in the same listeners. This is further demonstrated in FIG. 15 that shows comparative experimental data and model simulations for three subgroups of listeners. The RAM25 (25% duty cycle) yields improved responses in terms of EFR/ASSR response magnitudes than RAM50 (50% duty cycle) and SAM. As the model simulations show (triangles), this yields an improved sensitivity to quantify the individual synaptopathy degree.

The invention claimed is:

1. A system for determining the integrity of one or more of auditory nerve synapses (ANS), auditory nerve fibers (ANF) and inner-hair cells (IHC) in a subject, the system comprising:

a sound generation and stimulation device configured for generating an auditory stimulation s(t);

neural activity screening hardware configured for recording the subject's neural response as neural activity data when said subject is exposed to the auditory stimulation s(t) generated by the sound generation and stimulation device; and, a processing unit connected to the neural activity screening hardware that is configured to:
a) receive the neural activity data of the subject exposed to the auditory stimulation s(t), and,
b) determine from the neural activity data, a subject-specific degree of the integrity of one or more of the ANS, ANF and IHC;

wherein the auditory stimulation s(t) comprises a carrier signal c(t) amplitude modulated by a non-sinusoidal periodic modulator m(t) that has a rectangular waveform with a duty cycle d, wherein the duty cycle, expressed as a percentage, is at least 10% and at most 40%.

2. The system of claim 1, wherein the duty cycle, expressed as a percentage, is at least 15% and at most 35%.

3. The system of claim 1, wherein the rectangular waveform has a slope deviation window $\delta$ in the range of 0 and $\delta_{max}$; wherein $\delta_{max}=0.5*d$.

4. The system of claim 1, wherein the neural activity screening hardware comprises at least two EEG electrodes and an amplifier; and is configured for recording the subject's neural response as EEG signals in the time domain (TD).

5. The system of claim 4, wherein the processing unit is further configured to transform the EEG signals into the frequency domain (FD) by applying a Fourier Transform on a time-segment of the EEG signals.

6. The system of claim 1, wherein the subject is a human subject, and the neural activity screening hardware is configured for recording a human neural response.

7. The system of claim 1, wherein the processing unit is further configured to transform the neural activity data into the frequency domain (FD).

8. The system of claim 1, wherein the processing unit is further configured to determine a magnitude of the neural activity data at the frequency F0 corresponding to a stimulus modulation frequency fm and one or more frequencies which are harmonics F1 to Fn of the stimulus modulation frequency.

9. The system of claim 8, wherein the processing unit is further configured to:
identify at least 2 peaks in the frequency domain comprising at least:
a peak at the modulation frequency F0 of the auditory stimulation; and,
at least one peak at one or more harmonics of the modulation frequency F1 to Fn;
reconstruct from the identified peaks a reconstructed time domain waveform; and,
measure from the reconstructed time domain waveform, a magnitude of the reconstructed time domain waveform; wherein the magnitude is a measure of the level of the integrity of one or more of ANS, ANF and IHC in the subject.

10. The system of claim 1, wherein the processing unit is further configured to;
generate a personalized mathematical model for processing sound for an auditory device based on the subject-specific degree of integrity of one or more of the ANS, ANF and IHC in the subject.

11. The system of claim 10, wherein the processing unit is further configured to:

determine an outer hair cell (OHC) damage component; and, generate a personalized mathematical model for processing sound for an auditory device based on the integrity of one or more of the ANS, ANF, and IHC in the subject, and further the OHC damage component.

12. The system of claim 1, wherein the processing unit is further configured to:
   determine a subject-specific ANS and/or ANF auditory damage profile of the subject,
   include said auditory damage profile in a personalized mathematical auditory periphery model to simulate auditory responses to any acoustic stimulus;
   compare an individually simulated auditory response to a desired auditory response; and,
   include a signal-processing algorithm to adjust the the auditory stimulation s(t) such that the individually simulated auditory response matches the desired auditory response.

13. The system of claim 1, wherein the processing unit is further configured to:
   quantify a degree of one or more of ANS damage, ANF damage and IHC damage in the subject;
   obtain a marker of the subject that is only sensitive to Outer Hair Cell (OHC) damage and quantify the degree of Outer Hair Cell damage in the subject; and,
   map the degree of one or more of ANS, ANF and IHC damage to the degree of OHC damage.

14. The system of claim 1, wherein the duty cycle, expressed as a percentage, is at least 20% and at most 30%.

15. A non-transitory, computer-readable medium storing instructions that, when executed by one or more processors, cause a computing system to perform a method for determining the integrity of one or more of auditory nerve synapses (ANS), auditory nerve fibers (ANF) and inner-hair cells (IHC) in a subject, said method comprising the steps of:
   a) generating data configured for generating an auditory stimulation s(t):
   b) receiving neural activity data of the subject exposed to the auditory stimulation s(t); and,
   c) determining from the neural activity data, a subject-specific degree of the integrity of one or more of the ANS, ANF and IHC;
   wherein the auditory stimulation s(t) comprises a carrier signal c(t) amplitude modulated by a non-sinusoidal periodic modulator m(t) that has a rectangular waveform with a duty cycle d, wherein the duty cycle, expressed as a percentage, is at least 10% and at most 40%.

16. The non-transitory, computer-readable medium of claim 15, wherein the duty cycle, expressed as a percentage, is at least 15% and at most 35%.

17. A computer-implemented method for determining one or more of the integrity of auditory nerve synapses (ANS), auditory nerve fibers (ANF) and inner-hair cells (IHC) in a subject, said computer-implemented method comprising the steps of:
   a) receiving neural activity data of the subject exposed to an auditory stimulation s(t); and,
   b) determining from the neural activity data, a subject-specific degree of the integrity of one or more of the ANS, ANF and IHC;
   wherein the auditory stimulation s(t) comprises a carrier signal c(t) amplitude modulated by a non-sinusoidal periodic modulator m(t) that has a rectangular waveform with a duty cycle d, wherein the duty cycle, expressed as a percentage, is at least 10% and at most 40%.

18. The computer-implemented method of to claim 17, wherein the duty cycle, expressed as a percentage, is at least 15% and at most 35%.

* * * * *